United States Patent
Aida et al.

(10) Patent No.: US 11,635,335 B2
(45) Date of Patent: Apr. 25, 2023

(54) TEMPERATURE SENSING MATERIAL, AND TEMPERATURE DEVIATION TIME ESTIMATING SYSTEM EMPLOYING SAME

(71) Applicant: Hitachi Industrial Equipment Systems Co., Ltd., Tokyo (JP)

(72) Inventors: Kohhei Aida, Tokyo (JP); Shunsuke Mori, Tokyo (JP); Shigetaka Tsubouchi, Tokyo (JP); Shintarou Takeda, Tokyo (JP); Masahiro Kawasaki, Tokyo (JP); Kotaro Araya, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 392 days.

(21) Appl. No.: 16/955,516

(22) PCT Filed: Nov. 6, 2018

(86) PCT No.: PCT/JP2018/041114
§ 371 (c)(1),
(2) Date: Jun. 18, 2020

(87) PCT Pub. No.: WO2019/123866
PCT Pub. Date: Jun. 27, 2019

(65) Prior Publication Data
US 2021/0010873 A1    Jan. 14, 2021

(30) Foreign Application Priority Data
Dec. 21, 2017   (JP) .............................. JP2017-244633

(51) Int. Cl.
*G01K 11/16*   (2021.01)
*G01N 31/22*   (2006.01)

(52) U.S. Cl.
CPC ............ *G01K 11/16* (2013.01); *G01N 31/229* (2013.01)

(58) Field of Classification Search
CPC ........ G01K 11/16; G01K 3/04; G01N 31/229; C09D 11/50; C09K 9/02
See application file for complete search history.

(56) References Cited

U.S. PATENT DOCUMENTS

| | | | |
|---|---|---|---|
| 5,663,115 | A | 9/1997 | Naito et al. |
| 6,382,125 | B1 | 5/2002 | Tamura |

(Continued)

FOREIGN PATENT DOCUMENTS

| | | |
|---|---|---|
| CN | 1118887 A | 3/1996 |
| EP | 3 109 286 A1 | 12/2016 |

(Continued)

OTHER PUBLICATIONS

Extended European Search Report issued in European Application No. 18891263.8 dated Nov. 23, 2021 (seven (7) pages).

(Continued)

*Primary Examiner* — John Fitzgerald
*Assistant Examiner* — Tania Courson
(74) *Attorney, Agent, or Firm* — Crowell & Moring LLP

(57) ABSTRACT

An object of the present invention is to provide a temperature sensing material that changes a color density continuously with the lapse of time at a temperature not lower or higher than a predetermined temperature and a temperature deviation time estimating system using it. In order to achieve the above object, the temperature sensing material according to the present invention is a temperature sensing material having a structure of dispersing a temperature indicating material that changes color by crystallization in a dispersion medium and is characterized in that an average particle size of the temperature indicating material is not larger than a (Continued)

resolution when observed and a volume fraction of the temperature indicating material to the temperature sensing material is not less than 5% to less than 90%.

14 Claims, 9 Drawing Sheets

(56) References Cited

U.S. PATENT DOCUMENTS

| | | | |
|---|---|---|---|
| 6,479,293 B1 | 11/2002 | Tamura et al. | |
| 10,677,660 B2* | 6/2020 | Yuasa | G01K 11/16 |
| 11,397,115 B2* | 7/2022 | Tsubouchi | G01K 3/04 |
| 2010/0247900 A1 | 9/2010 | Parker et al. | |
| 2018/0217114 A1 | 8/2018 | Aratani et al. | |
| 2019/0300740 A1* | 10/2019 | Aida | G01J 5/025 |
| 2019/0316975 A1 | 10/2019 | Tada et al. | |
| 2021/0063252 A1* | 3/2021 | Aida | C09K 9/02 |

FOREIGN PATENT DOCUMENTS

| | | | | |
|---|---|---|---|---|
| EP | 3557208 A1 * | 10/2019 | | C09D 11/03 |
| EP | 3730911 A1 * | 10/2020 | | G01K 11/16 |
| JP | 2001-91368 A | 4/2001 | | |
| JP | 2017-106005 A | 6/2017 | | |
| WO | WO 2010/061819 A1 | 6/2010 | | |
| WO | WO 2010/064447 A1 | 6/2010 | | |
| WO | WO 2017/038292 A1 | 3/2017 | | |
| WO | WO 2017/203850 A1 | 11/2017 | | |
| WO | WO 2017/203851 A1 | 11/2017 | | |

OTHER PUBLICATIONS

Chinese-language Office Action issued in Chinese Application No. 201880081390.6 dated Nov. 1, 2021 with English translation (14 pages).

International Search Report (PCT/ISA/210) issued in PCT Application No. PCT/JP2018/041114 dated Dec. 4, 2018 with English translation (two (2) pages).

Japanese-language Written Opinion (PCT/ISA/237) issued in PCT Application No. PCT/JP2018/041114 dated Dec. 4, 2018 (three (3) pages).

* cited by examiner

EXAMPLE 1

EXAMPLE 2

COMPARATIVE EXAMPLE 1

COMPARATIVE EXAMPLE 2

EXAMPLE 3

EXAMPLE 4

COMPARATIVE EXAMPLE 3

TEMPERATURE SENSING MATERIAL, AND TEMPERATURE DEVIATION TIME ESTIMATING SYSTEM EMPLOYING SAME

TECHNICAL FIELD

The present invention relates to a temperature sensing material and a temperature deviation time estimating system using the temperature sensing material.

BACKGROUND ART

Fresh foods, frozen foods, and cryopreserved drugs such as vaccines and biomedicines require a cold chain to keep those products at a low temperature without interruption through a distribution route including production, transportation, and consumption. A freight container is usually equipped with a data logger capable of continuously recording time and temperature in many cases in order to measure and record a temperature constantly during distribution and it is possible to reveal the whereabouts of the responsibility if a product is damaged. A data logger, however, is not suitable for individual product management because of the price and the size.

In the case of managing individual product quality, there is a method of using not a data logger but a relatively inexpensive temperature indicator. A temperature indicator does not have such a recording accuracy as a data logger but is attachable to an individual product, the surface is colored when the temperature is above or below a preset temperature, and hence the change of a temperature environment can be known.

A temperature indicator, however, has the nature of changing color irreversibly and hence requires temperature control before it is used for product management. Further, another problem is that it cannot be reused.

Assuming the attachment of a temperature indicator to an individual product, in the management of expensive products such as pharmaceuticals, there is a need to prevent forgery and complete irreversibility is required of an indicator after temperature deviation. In the management of inexpensive products such as fresh foods, however, from the aspect of cost, it is sufficient if it is irreversible in an operating temperature range and there are needs for reuse, transportation at room temperature, and storage at room temperature of a temperature indicator rather than complete irreversibility. A temperature indicator that can initialize color by a simple method therefore is desired.

When products such as fresh foods and biomedicines which degrade quality depending on temperature and time are managed, a time-temperature indicator that changes color by integrating time and temperature is used. Examples of such a time-temperature indicator include an indicator that changes color by infiltrating ink the viscosity of which changes by temperature into an infiltration material and the like. In the case of such a time-temperature indicator, however, ink alone does not function as a time-temperature indicator and hence the problems are that the structure of an indicator is complicated and the price is hardly reduced. Further, another problem is that it cannot be reused.

As a temperature sensing ink that can initialize color, PTL 1 discloses a reversible thermochromic microcapsule pigment enclosing a reversible thermochromic composition showing discoloration behavior of: changing from a decolorized state to a colored state by heating of a relatively low temperature; being able to keep the colored state even by subsequent cooling; and being able to return to a colored state again through a decolorized state by heating.

PTL 2 discloses a temperature indicating member that: changes color density by temperature; is irreversible under ambient temperature; and changes color between crystalline and amorphous or between phase separation and non-phase separation. It is disclosed that temperature management is carried out by irradiating a temperature indicating member with light of a wavelength that is absorbed by the color when the temperature indicating member is colored and sensing reflected light intensity or transmitted light intensity.

CITATION LIST

Patent Literature

PTL 1: Japanese Patent Application Laid-Open No. 2017-106005

PTL 2: Japanese Patent Application Laid-Open No. 2001-091368

SUMMARY OF INVENTION

Technical Problem

As stated above, a temperature sensing material that can initialize color by a simple method and changes color by integrating time and temperature, the color change being irreversible in a predetermined temperature range, is desired.

In a reversible thermochromic microcapsule pigment disclosed in Patent literature 1, color change by integrating time and temperature is not taken into consideration.

In a temperature management member disclosed in PTL 2, reproducibility of color change by integrating time and temperature is not sufficiently examined. In the case of a material that changes color by crystallization in particular, it is necessary to examine the reproducibility of color change. The reason is that crystallization is a phenomenon that occurs when a crystal nucleus is generated and is a phenomenon that occurs at random in accordance with crystal nucleation frequency that is different for each material. Further, crystallization is strongly influenced by the presence of impurities and an interface such as a vessel wall. When crystal nuclei are generated at one location and crystallization starts, the nuclei exert influence and the crystallization propagates around. The crystallization therefore advances undesirably.

In order to sense deviation time from color change in a temperature sensing material, always the color of the sensing material must change while having a constant relationship with time. On the contrary, a temperature indicating material that changes color by crystallization changes color at random and hence accuracy in sensing time deteriorates undesirably. Further, when once crystallization starts at one location, the crystallization progresses abruptly and hence color change is completed abruptly. It is therefore difficult to estimate an elapsed time from the degree of color change.

An object of the present invention therefore is to provide: a temperature sensing material that changes a color density continuously with the lapse of time at a temperature not lower or higher than a predetermined temperature; and a temperature deviation time estimating system using the temperature sensing material.

Solution to Problem

In order to achieve the above object, a temperature sensing material according to the present invention: has a structure of dispersing a temperature indicating material that changes color by crystallization; and is characterized in that an average particle size of the temperature indicating material is not larger than a resolution when observed and a volume fraction of the temperature indicating material to the temperature sensing material is not less than 5% to less than 90%.

Advantageous Effects of Invention

The present invention makes it possible to provide: a temperature sensing material that changes a color density continuously with the lapse of time at a temperature not lower or higher than a predetermined temperature; and a temperature deviation time estimating system using the temperature sensing material.

DESCRIPTION OF EMBODIMENTS

Figure 1A:
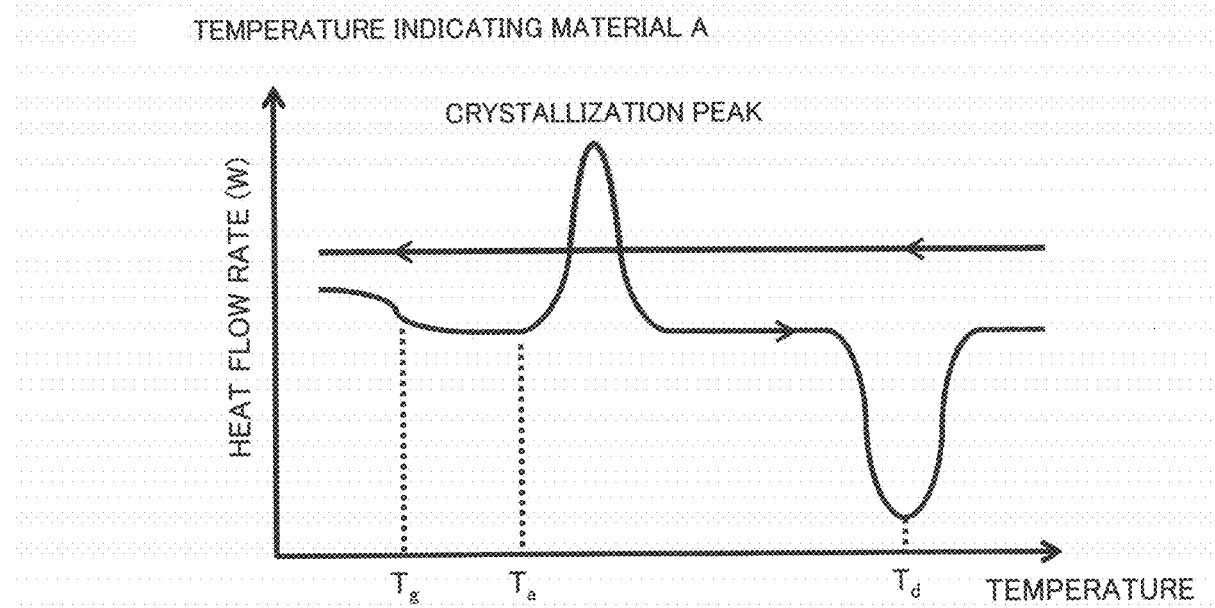
FIGS. 1A and 1B are views showing differential scanning calorimetry curves of temperature indicating materials according to an embodiment.

Forms for applying the present invention (hereunder referred to as "embodiments") are explained hereunder in detail in reference to drawings appropriately. Here, in the drawings, common parts are represented by an identical reference sign and duplicated explanations are avoided.

A temperature sensing material according to an embodiment of the present invention has a structure of dispersing a temperature indicating material that changes color by crystallization in a dispersion medium.

<Temperature Indicating Material>

As a temperature indicating material, a material that changes a color density reversibly by temperature change (temperature rise/temperature drop) is used. The temperature indicating material includes a leuco dye that is an electron releasing compound, a color developer that is an electron accepting compound, and a color eraser for controlling the temperature range of discoloration.

Figure 1B:
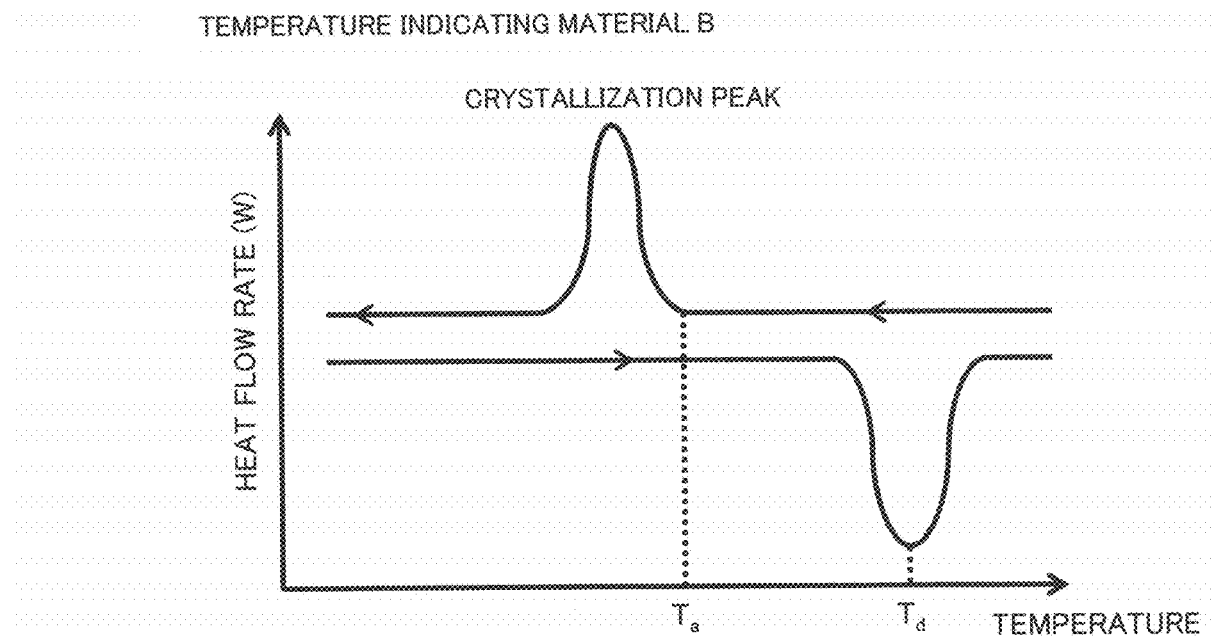

FIG. 1 is a view showing differential scanning calorimetry (DSC) curves of temperature indicating materials according to an embodiment. Here, the temperature indicating material A is a material that solidifies in an amorphous state without crystallization when quenched after melted and the temperature indicating material B is a material that becomes a supercooled liquid state when cooled after melted.

FIG. 1($a$) is a DSC curve of the temperature indicating material A. Since crystallization does not occur during a cooling process (left arrow (←) in the figure), an exothermic peak by crystallization is not observed. On the other hand, an exothermic peak (crystallization peak) by crystallization is observed during a heating process (right arrow (→) in the figure). $T_a$ is a start temperature during a heating process (crystallization start temperature during the heating process). $T_d$ is a melting point.

The start temperature $T_a$ depends on a heating rate and an elapsed time. When the material is heated at a low heating rate, a start temperature appears at a low temperature and, when the material is heated at a high heating rate, a start temperature appears at a high temperature or a start temperature does not appear and the material melts at a melting point $T_d$. When crystallization occurs, color develops. It is only necessary to set a crystallization start temperature in conformity with the requirements of a sensing temperature and a sensing time. For example, a temperature indicating material that starts crystallization after one hour has elapsed at a certain temperature can be used as a material that senses that one our has elapsed at a start temperature with the certain temperature regarded as the start temperature. Here, $T_g$ is a glass transition point. Crystallization does not start at a temperature not higher than the glass transition point. In the case of a material that easily crystallizes, the material easily crystallizes at a temperature not lower than the glass transition point and hence the start temperature and the glass transition point are often the same.

FIG. 1($b$) shows a DSC curve of the temperature indicating material B. $T_a$ is a start temperature (crystallization start temperature during a cooling process) of an exothermic peak (crystallization peak) by crystallization during the cooling process. $T_d$ is a melting point. The start temperature depends on a cooling rate and an elapsed time. When the material is cooled at a low cooling rate, a start temperature appears at a high temperature and, when the material is cooled at a high cooling rate, a start temperature appears at a low temperature. When crystallization occurs, color develops and hence a start temperature is set in conformity with the requirements of a sensing temperature and a sensing time as a temperature sensing material. For example, a temperature indicating material that starts crystallization after one hour has elapsed at a certain temperature can be used as a material that senses that one hour has elapsed at a start temperature with the certain temperature regarded as the start temperature. Further, in the case of a material that is unlikely to be in a supercooled state, the material easily crystallizes at a temperature not higher than a melting point and hence the start temperature and the melting point are the same. Such a material cannot be used as a temperature indicating material. In other words, a material that is likely to be in a supercooled state and has a large difference between a crystallization start temperature and a melting point is desirable.

FIG. 2 is a view showing color density changes of temperature indicating materials according to an embodiment. In each of the views in FIG. 2, the vertical axis represents a color density and the horizontal axis represents a temperature.

Figure 2A:
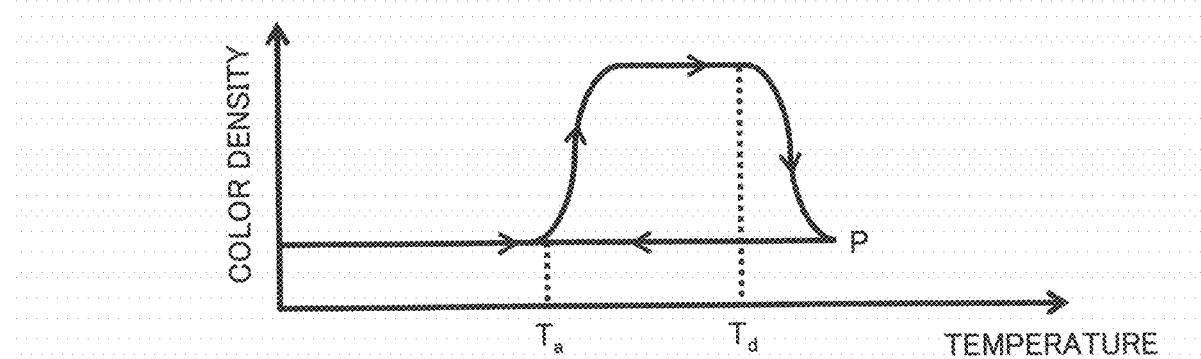
FIGS. 2A and 2B are views showing color density changes of temperature indicating materials according to an embodiment.

FIG. 2(a) is a view showing a relationship between a color density and a temperature in a temperature indicating material A. The temperature indicating material A has a hysteresis characteristic in color density change. In the temperature indicating material A, if a material that hardly crystallizes is used as a color eraser, when the temperature indicating material A is rapidly cooled from P in a molten state at a temperature not lower than a decolorization start temperature $I_d$ to a temperature not higher than a color development start temperature $T_a$, the temperature indicating material A forms an amorphous state while the color eraser takes in the color developer and maintains the decolorized state. From the state, when the temperature is raised to a temperature not lower than the color development start temperature $T_a$ during a heating process, the color eraser crystallizes and color is developed. If a temperature sensing material including the temperature indicating material A is used therefore, when temperature is controlled so as to be lower than the color development start temperature $T_a$, it is possible to sense whether or not the temperature deviates from a control range and reaches a temperature not lower than $T_a$.

Figure 2B:
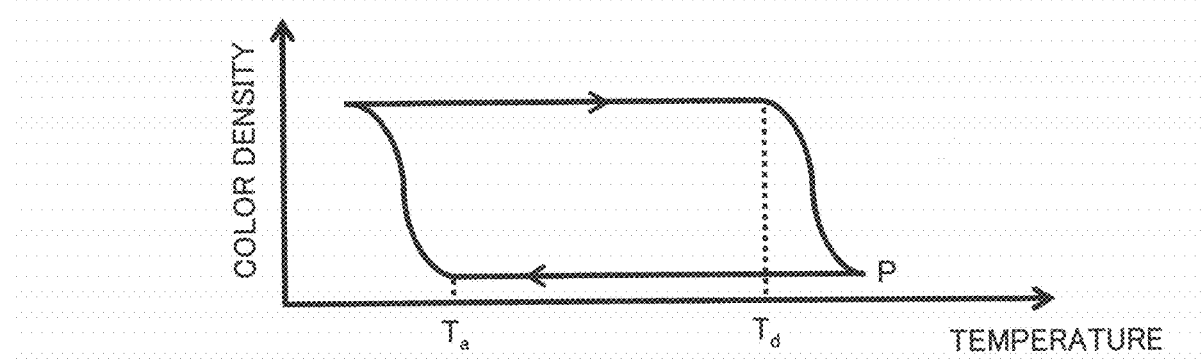

FIG. 2(b) is a view showing a relationship between a color density and a temperature in a temperature indicating material B. The temperature indicating material B has a hysteresis characteristic in color density change. When the temperature of the temperature indicating material B drops from the state of P that is a molten state at a temperature not lower than a decolorization temperature $T_d$, the decolorized state is maintained until a color development temperature $T_a$. When the temperature drops to a temperature not higher than the color development temperature $T_a$, the color eraser is in a crystalline state at a temperature not higher than the solidifying point, the leuco dye and the color developer are separated, and thus the leuco dye and the color developer combine and develop color. If a temperature sensing material including the temperature indicating material B is used therefore, when temperature is controlled so as to be higher than the color development start temperature $T_a$, it is possible to sense whether or not the temperature deviates from a control range and reaches a temperature not higher than $T_a$.

When a temperature sensing material is used for temperature management of a product such as a commodity during distribution of the product, the temperature sensing material is required not to return color. The reason is that, even if the temperature once rises and color changes during distribution, when the temperature drops or rises again during a distribution process and the color returns to the original color, it is impossible to know whether or not the temperature has changed. A temperature indicating material according to the present embodiment, however, does not return color unless heated to a temperature not lower than the decolorization temperature $I_d$ and hence it is possible to know the change of a temperature environment.

A leuco dye, a color developer, and a color eraser in a temperature indicating material are explained hereunder.

(Leuco Dye)

A leuco dye is an electron releasing compound and a material heretofore known as a dye for pressure-sensitive copying paper or a dye for heat-sensitive recording paper can be used. Examples include: a triphenylmethane phthalide system; a fluoran system; a phenothiazine system; an indolyyphthalide system; a leucoauramine system; a spiropyran system; a rhodamine lactam system; a triphenylmethane system; a triazene system; a spirophthalanxanthene system; a naphtholactam system; and an azomethine system. Specific examples of the leuco dye include: 9-(N-ethyl-N-isopentylamino)spiro[benzo[a]xanthene-12,3'-phthalide]; 2-methyl-6-(Np-tolyl-N-ethylamino)-fluoran 6-(diethylamino)-2-[(3-trifluoromethyl)anilino]xanthene-9-spiro-3'-phthalide; 3,3-bis(p-diethylaminophenyl)-6-dimethylamino phthalide; 2'-anilino-6'-(dibutylamino)-3'-methylspiro [phthalide-3,9'-xanthene]; 3-(4-diethylamino-2-methylphenyl)-3-(1-ethyl-2-methylindole-3-yl)-4-azaphthalide; and 1-ethyl-8-[N-ethyl-N-(4-methylphenyl)amino]-2,2,4-trimethyl-1,2-dihydrospiro[11H-chromeno[2,3-g]guinoline-11, 3'-phthalide].

A temperature indicating material may be used by combining two or more leuco dyes.

(Color Developer)

A color developer develops a color by touching an electron releasing leuco dye and thus changing the structure of the leuco dye. As a color developer, a material known as a color developer and used for heat-sensitive recording paper or pressure-sensitive copying paper can be used. Specific examples of such a color developer include phenols such as benzyl 4-hydroxybenzoate; 2,2'-biphenol; 1,1-bis(3-cyclohexyl-4-hydroxyphenyl)cyclohexane; 2,2-bis(3-clohexyl-4-hydroxyphenyl)propane; bisphenol A; bisphenol F; bis(4-hydroxyphenyl)sulfide; parahydroybenzoates; and gallic acid ester. The color developer is not limited to those materials and any compound is acceptable as long as it is an electron acceptor and can change the color of a leuco dye. Further, metallic salts of carboxylic acid derivatives; salicylic acids and salicylic acid metallic salts; sulfonic acids; sulfonates; phosphoric acids; phosphoric acid metallic salts; acidic phosphoric acid esters; acidic phosphoric acid ester metallic salts; phosphorous acids; phosphorous acid metallic salts; and the like may also be used. In particular, a material highly compatible with a leuco dye and a color eraser that will be described later is, preferably used and organic color developers such as benzyl 4-hydroxybenzoate, 2,2'-bisphenol, bisphenol A, gallate, and the like are preferably used.

A temperature indicating material may include one kind or a combination of two or more kinds of color developers. By combining color developers, the color density of a leuco dye can be adjusted during color developing. The quantity of a used color developer is selected in accordance with a desired color density. For example, a color developer may usually be selected in the range of about 0.1 to 100 parts by mass with respect to a leuco dye of 1 part by mass.

(Color Eraser)

A color eraser is a chemical compound capable of dissociating a bond between a leuco dye and a color developer and is a chemical compound capable of controlling a coloration temperature between a leuco dye and a color developer. Generally, in a temperature range where a leuco dye is in a colored st color eraser is solidified in the state of phase separation. On the other hand, in a temperature range where a leuco dye is in decolorized state, color eraser melts in the state of exhibiting the function of dissociating a bond between the leuco dye and a color developer. A st to change temperature of a color eraser therefore is important for the temper are control of a temperature indicting material.

As a color eraser, a material caable of dissociating a bond between a leuco dye and a color developer can be used widely Various materials can be color eraser as long as the material has a low polarity and does not develop a color with a leuco dye but has a high polarity to the extent of dissolving the leuco dye and a color developer. Typically, various kinds of organic compounds including: hydroxy compounds; ester compounds; peroxy compounds; carbonyl compounds; aromatic compounds; aliphatic compounds; halogen compounds; amino compounds; amino compounds; N-oxide compounds; hydroxyamine coupounds; nitro compounds; azo compounds; diazo compounds; azides; ether compounds; oil compounds; saccharide compounds; peptide compounds; nucleic acid compounds; alkaloid compounds; steroid compounds; and the like can be used. Specifically, ester compounds including tricaprin; isopropyl myristate; m-tolyl acetate; diethyl sebacate; dimethyl adipate; 1,4-diacetoxybutane; decyl decanoate; diethyl phenylmalonate; diisobutyl phthalate; triethyl citrate; benzyl butyl phthalate; butyl phthalyl butyl glycolate; methyl N-methylanthranilate; ethyl anthranilate; 2-hydroxyethyl salicylate; methyl nicotinate; butyl 4-aminobenzoate; methyl p-toluate; ethyl 4-nitrobenzoate; 2-phenylethyl phenyl acetate; benzyl cinnamate; methyl acetoacetate; geranyl acetate; dimethyl succinate; dimethyl sebacate; diethyl oxaloacetate; monoolein; butyl palmitate; ethyl stearate; methyl palmitate; methyl stearate; linalyl acetate; di-n-octyl phthalate; benzyl benzoate; diethylene glycol dibenzoate; methyl p-anisate; m-tolyl acetate; cinnamyl cinnamate; 2-phenylethyl propionate; butyl stearate; ethyl myristate; methyl myristate; methyl anthranilate; neryl acetate; isopropyl palmitate; ethyl 4-fluorobenzoat; cyclandelate (isomer mixture); butopyronoxyl; ethyl 2-bromopropionate; tricaprylin; ethyl levulinate; hexadecyl palmitate; tert-butyl acetate; 1,1-ethanediol diacetate; dimethyl oxalate; tristearin; methyl acetylsalicylate; benzal diacetate; methyl 2-benzoylbenzoate; ethyl 2,3-dibromobutyrate; ethyl 2-furancarboxylate; ethyl acetopyruvate; ethyl vanillate; dimethyl itaconate; methyl 3-bromobenzoate; monoethyl adipate; dimethyl adipate; 1,4-diacetoxy butane; diethylene glycol diacetate; ethyl palmitate; diethyl terephthalate; phenyl propionate; phenyl stearate; 1-naphthyl acetate; methyl behenate; methyl arachidate; methyl 4-chlorobenzoate; methyl sorbate; ethyl isonicotinate; dimethyl dodecanedioate; methyl heptadecanoate; ethyl α-cyanocinnamate; N-phenylglycine ethyl; diethyl itaconate; methyl picolinate; methyl isonicotinate; methyl DL-mandelate; methyl 3-aminobenzoate; methyl 4-methylsalicylate; diethyl benzylidenemalonate; isoamyl DL-mandelate; triethyl methanetricarboxylate; diethyl formaminomalonate; 1,2-bis (chloroacetoxy) ethane; methyl pentadecanoate; ethyl arachidate; ethyl 6-bromohexanoate; monoethyl pimelate; hexadecyl lactate; ethyl benzilate; mefenpyr-diethyl; procaine; dicyclohexyl phthalate; 4-tert-butylphenyl salicylate; isobutyl 4-aminobenzoate; butyl 4-hydroxybenzoate; tripalmitin; 1,2-diacetoxy benzene; dimethyl isophthalate; monoethyl fumarate; methyl vanillate; methyl 3-amino-2-thiophenecarboxylate; etomidate; cloquintocet-mexyl; methyl benzilate; diphenyl phthalate; phenyl benzoate; propyl 4-aminobenzoate; ethylene glycol dibenzoate; triacetin; ethyl pentafluoropropionate; methyl 3-nitrobenzoate; 4-nitrophenyl acetate; methyl 3-hydroxy-2-naphthoate; trimethyl citrate; ethyl 3-hydroxybenzoate; methyl 3-hydroxybenzoate; trimebutine; 4-methoxybenzyl acetate; pentaerythritol tetra-acetate; methyl 4-bromobenzoate; ethyl 1-naphthaleneacetate; 5-nitro-2-furaldehyde diacetate; ethyl 4-aminobenzoate; propyl paraben; 1,2,4-triacetoxybenzene; methyl 4-nitrobenzoate; diethyl acetamidomalonate; valethamate bromide; 2-naphthyl benzoate; dimethyl fumarate; ajifenin hydrochloride; benzyl 4-hydroxybenzoate; ethyl 4-hydroxybenzoate; vinyl butyrate; vitamin K4; methyl 4-iodobenzoate; methyl 3,3-dimethylacrylate; propyl gallate; 1,4-diacetoxy benzene; diethyl meso oxalate; dimethyl 1,4-cyclohexanedicarboxylate (cis-, trans-mixture); triethyl 1,1,2-ethane tricarboxylate; dimethyl hexafluoroglutarate; amyl benzoate; ethyl 3-bromobenzoate; ethyl 5-bromo-2-chlorobenzoate; bis(2-ethylhexyl) phthalate; diethyl allylmalonate; diethyl bromomalonate; diethyl ethoxymethylenemalonate; diethyl ethylmalonate; diethyl fumarate; diethyl maleate; diethyl malonate; diethyl phthalate; dimethyl 1,3-acetonedicarboxylate; dimethyl phthalate; ethyl 3-aminobenzoate; ethyl benzoate; ethyl 4-(dimethylamino)benzoate; ethyl nicotinate; ethyl phenylpropiolate; ethyl pyridine-2-carboxylate; ethyl 2-pyridylacetat; ethyl 3-pyridylacetate; methyl benzoate; ethyl phenylacetate; amyl 4-hydroxybenzoate; 2,5 diacetoxy toluene; ethyl 4-oxazolecarboxylate; trimethyl 1,3,5-cyclohexanetricarboxylate (cis-, trans-mixture); methyl 3-(chlorosulfonyl)-2-thiophenecarboxylate; pentaerythritol distearate; benzyl laurate; diethyl acetylenedicarboxylate; phenyl methacrylate; benzyl acetate; dimethyl glutarate; ethyl 2-oxocyclohexanecarboxylate; ethyl phenylcyanoacetate; ethyl 1-piperazinecarboxylate; methyl benzoylformate; methyl phenylacetate; phenyl acetate; diethyl succinate; tributyrin; diethyl methylmalonate; dimethyl oxalate; diethyl 1,1-cyclopropanedicarboxylate; dibenzyl malonate; methyl 4-tert-butylbenzoate; ethyl 2-oxocyclopentanecarboxylate; methyl cyclohexanecarboxylate; ethyl 4-methoxyphenylacetate; methyl 4-fluorobenzoylacetate; dimethyl maleate; methyl terephthalaldehydate; ethyl 4-bromobenzoate; methyl 2-bromobenzoate; methyl 2-iodobenzoate; ethyl 3-iodobenzoate; ethyl 3-furancarboxylate; diallyl phthalate; benzyl bromoacetate; dimethyl bromomalonate; methyl m-toluate; diethyl 1,3-acetonedicarboxylate; methyl phenylpropiolate; 1-naphthyl butyrate; ethyl o-toluate; methyl 2-oxocyclopentanecarboxylate; isobutyl benzoate; ethyl 3-phenylpropionate; di-tert-butyl malonate; dibutyl sebacate; diethyl adipate; diethyl terephthalate; dipropyl phthalate; 1,1-ethanediol diacetate; diisopropyl adipate; diisopropyl fumarate; ethyl cinnamate; 2-ethylhexyl 2cyano-3,3-diphenylacrylate; neopentyl glycol diacrylate; triolein; ethyl benzoylacetate; ethyl p-anisate; diethyl suberate; sorbitan tristearate; sorbitan monostearate; amide stearate; glycerol monostearate; glycerol distearate; 3-(tert-butoxycarbonyl) phenylboronic acid; racecadotril; 4-[(6-acryloyloxy)hexyloxy]-4'-cyanobiphenyl; 2-(dimethylamino)vinyl 3-pyridyl ketone; stearyl acrylate; ethyl 4-bromophenylacetate; dibenzyl phthalate; methyl 3,5-dimethoxybenzoate; eugenol acetate; didodecyl 3,3'-thiodipropionate; vanillin acetate; diphenyl carbonate; ethyl oxanilate; methyl terephthalaldehydate; dimethyl 4-nitrophthalate; ethyl (4-nitrobenzoyl)acetate; dimethyl nitroterephthalate; methyl 2-methoxy-5-(methylsulfonyl) benzoate; methyl 3-methyl-4-nitrobenzoate; dimethyl 2,3-naphthalenedicarboxylate; bis(2-ethylhexyl) adipate; 4'-acetoxyacetophenone; ethyl trans-3-benzoylacrylate; ethyl coumarin-3-carboxylate; BAPTA tetraethyl ester; methyl 2,6-dimethoxybenzoate; di-tert-butyl iminodicarboxylate; benzyl p-benzyloxybenzoate; methyl 3,4,5-trimethoxybenzoate; methyl 3-amino-4-methoxybenzoate; diethylene glycol distearate; ditetradecyl 3,3'-thiodipropionate; ethyl 4-nitrophenylacetate; methyl 4-chloro-3-nitrobenzoate; 1,4 dipropionyl oxybenzene; dimethyl terephthalate; ethyl 4-nitrocinnamate; dimethyl 5-nitroisophthalate; triethyl 1,3,5-benzenetricarboxylate; diethyl N-(4-aminobenzoyl)-L-glutamate; 2-methyl-1-naphthyl acetate; 7-acetoxy-4-methylcoumarin; methyl 4-amino-2-methoxybenzoate; 4,4'-diacetoxybiphenyl; dimethyl 5-aminoisophthalate; diethyl 1,4-dihydro-2,6-dimethyl-3,5-pyridinedicarboxylate; dimethyl 4,4'-biphenyldicarboxylate; 4-benzyloxyphenylethyl octanoate; 4-benzyloxyphenylethyl nonanoate; 4-benzyloxyphenylethyl decanoate; 4-benzyloxyphenylethyl undecanoate; 4-benzyloxyphenylethyl dodecanoate; 4-benzyloxyphenylethyl tridecanoate; 4-benzyloxyphenylethyl tetradecanoate; 4-benzyloxyphenylethyl pentadecanoate; 4-benzyloxyphenylethyl hexadecanoate; 4-benzyloxyphenylethyl heptadecanoate; 4-benzyloxyphenylethyl octadecanoate; 1,1-diphenylmethyl octanoate; 1,1-diphenylmethyl nonanoate; 1,1-diphenylmethyl decaoate; 1,1-diphenylmethyl undecanoate; 1,1-diphenylmethyl dodecanoate; 1,1-diphenylmethyl tridecanoate; 1,1-diphenylmethyl tetradecanoate; 1,1-diphenylmethyl pentadecanoate; 1,1-diphenylmethyl hexadecanoate; 1,1-diphenylmethyl heptadecanoate; 1,1-diphenylmethyl octadecanoate; and the like, and steroid compounds including cholesterol; cholesteryl bromide; β-estradiol; methylandrostenediol; pregnenolone; cholesterol benzoate; cholesterol acetate; cholesterol linoleate; cholesterol palmitate; cholesterol stearate; cholesterol n-octanoate; cholesterol oleate; 3-chlorocholestene; cholesterol trans-cinnamate; cholesterol decanoate; cholesterol hydrocinnamate; cholesterol laurate; cholesterol butyrate; cholesterol formate; cholesterol heptanoate; cholesterol hexanoate; hydrogen cholesterol succinate; cholesterol myristate; cholesterol propionate; cholesterol valerate; hydrogen cholesterol phthalate; cholesterol phenylacetate; cholesterol chloroformate; cholesterol 2,4-dichlorobenzoate; cholesterol pelargonate; cholesterol nonyl carbonate; cholesterol heptyl carbonate; cholesterol oleyl carbonate; cholesterol methyl carbonate; cholesterol ethyl carbonate; cholesterol isopropyl carbonate; cholesterol butyl carbonate; cholesterol isobutyl carbonate; cholesterol amyl carbonate; cholesterol n-octyl carbonate; cholesterol hexyl carbonate; allylestrenol; altrenogest; 9(10)-dehydronandrolone; estrone; ethinyl estradiol; estriol; estradiol benzoate; β-estradiol 17-shipionato; β-estradiol 17-valerate; α-estradiol; β-estradiol 17-heptanoate; gestrinone; mestranol; 2-methoxy-β-estradiol; nandrolone; (−)-norgestrel; quinestrol; trenbolone; tibolone; stanolone; androsterone; abiraterone; abiraterone acetate; dehydroepiandrosterone; dehydroepiandrosterone acetate; ethisterone; epiandrosterone; 17β-hydroxy-17-methylandrosta-1,4-diene-3-one; methylandrostenediol; methyltestosterone; Δ9(11)-methyltestosterone; 1α-methylandrostane-17β-ol-3-one; 17α-methylandrostane-17β-of-3-one; stanozolol; testosterone; testosterone propionate; altrenogest; 16-dehydropregnenolone acetate; 16,17-epoxypregnenolone acetate; 11α-hydroxy progesterone; 17α-hydroxy progesterone caproate; 17α-hydroxy progesterone; pregnenolone acetate; 17α-hydroxy progesterone acetate; megestrol acetate; medroxyprogesterone acetate; pregnenolone acetate; 5β-pregnane-3α,20α-diol; budesonide; corticosterone; cortisone acetate; cortisone; cortexolone; deoxycorticosterone acetate; deflazacort; hydrocortisone acetate; hydrocortisone; hydrocortisone 17-butyrate; 6α-methylprednisolone; prednisolone; prednisone; prednisolone acetate; sodium deoxycholate; sodium cholate; methyl cholate; methyl hyodeoxycholate; β-cholestanol; cholesterol-5α,6α-epoxide; diosgenin; ergosterol; β-sitosterol; stigmasterol; β-sitosterol acetate; and the like are named. Those compounds may preferably be included from the viewpoint of compatibility with a leuco dye and a color developer. It goes without saying that a color eraser is not limited to those compounds and any material is acceptable as long as the material can dissociate a bond between a leuco dye and a color developer.

Further, such a color eraser may include one kind or a combination of two or more kinds of color erasers. By combining color erasers, a solidifying point, crystallization speed, and a melting point can be adjusted.

A color eraser used for a temperature indicating material A is required not to crystallize during a quenching process from a temperature at which the color eraser melts but to amorphize near a glass transition point. A material that hardly crystallizes therefore is desirable. Almost all materials form amorphous states if they are quenched very rapidly but, if practical applicability is taken into consideration, a material that hardly crystallizes to the extent of forming an amorphous state by quenching with a generally used cooling device is desirable. A material that hardly crystallizes to the extent of forming an amorphous state during a process of cooling down naturally from a molten state at a temperature not lower than a melting point is more desirable. Specifically, a color eraser that forms an amorphous state when it is cooled from a melting point to a glass transition point at a rate of not lower than 1° C./min is desirable and a color eraser that forms an amorphous state when it is cooled from a melting point to a glass transition point at a rate of not lower than 2° C./min is more desirable.

As a color eraser used for a temperature indicating material B, a material having a supercooled state in a wide temperature range, in other words having a large temper are difference between a solidifying point and a melting point, is desirable. Further, the temperature of a me ng point or a solidifying point depends on a target temperature control range.

In order to initialize color, the temperature of a temperature indicating material must be raised to a temperature not lower than the melting point of a color eraser. A temperature for initializing color must be a high temperature to the extent of not coming close to a management temperature; but, if practical applicability taken into consideration, is desirably in a temperature range that can be heated with a generally used heating device. Further, as a temperature sensing material, a microcapsule or a matrix material is used for dispersing a temperature indicating material and hence the thermal resistance of those materials must be taken into consideration. Specifically, about 40° C. to 250° C. is desirable and about 60° C. to 150° C. is most desirable.

A temperature indicating material includes at least a leuco dye, a color developer, and a color eraser stated above. When a material having a color developing function and a color erasing function in one molecule is contained, however, a color developer and a color eraser may not be included. Further, as long as a performance of changing color by crystallization is maintained, a material other than a leuco dye, a color developer, and a color eraser can be included. For example, by adding a pigment, color at the time of color erasing or color developing can be changed.

<Temperature Sensing Material>

The temperature indicating material A stated above is a material that changes a color change speed in accordance with temperature when the temperature rises to a temperature not lower than a start temperature $T_a$ and the temperature indicating material B is a material that changes a color change speed in accordance with temperature when the temperature drops to a temperature not higher than a start temperature $T_a$. The color change is causes by crystallization. The color change therefore is a phenomenon occurring at random in accordance with a crystallization speed and the temporal reproducibility of the color change is low.

Figure 3:
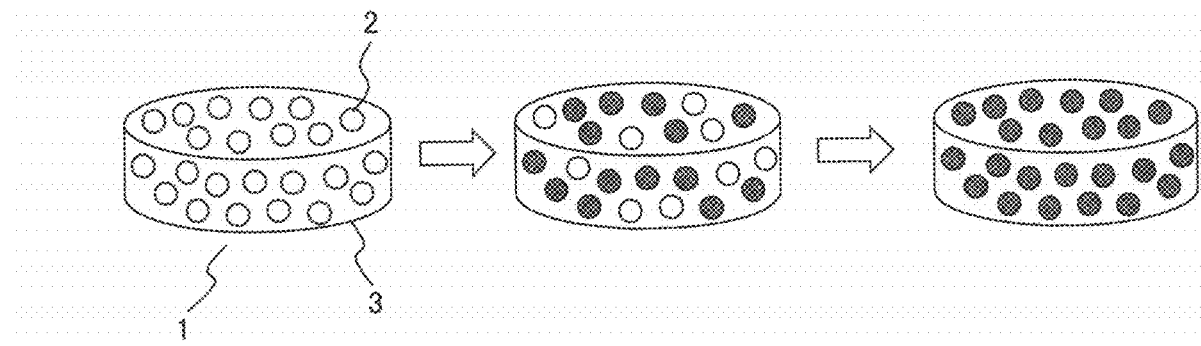
FIG. 3 is a schematic view showing a form of a temperature sensing material according to an embodiment.

FIG. 3 is a schematic view showing a form of a temperature sensing material according to an embodiment. As shown in FIG. 3, a temperature sensing material 1 is configured so as to disperse many temperature indicating materials 2 in a dispersion medium 3.

Crystallization is a phenomenon occurring by generating a crystal nucleus and a phenomenon occurring at random in accordance with crystal nucleation frequency (crystallization speed) depending on temperature for each material. A time of generating a crystal nucleus, namely a time of crystallization, is not constant and temporal reproducibility is low. When many temperature indicating materials having the same crystallization speed exist and the times at which respective temperature indicating materials crystallize are measured, however, the average time is estimated to come close to a constant value as the number of measured temperature indicating materials increases. When many temperature indicating materials exist therefore, the average time at which the temperature indicating materials crystallize is always constant. When a temperature sensing material in which many temperature indicating materials exist is used therefore, the color when observed is the average color of the many temperature indicating materials and hence the reproducibility of color change can be improved.

Further, since crystallization is strongly influenced by the existence of impurities and an interface such as a wall surface of a container and tends to occur, in order to make many temperature indicating materials having an identical crystallization speed exist, it is necessary to equalize the influence which crystallization receives from an interface in all the temperature indicating materials. Furthermore, when temperature indicating materials exist close to each other, if crystal nuclei are generated at one location, crystallization propagates around by being influenced by the nuclei, thus the crystallization speed increases, and hence the crystallization speeds of the temperature indicating materials are equalized. Many temperature indicating materials therefore are required to be in a state of isolated to the extent of being able to ignore the influence of crystallization between the temperature indicating materials.

Once the crystallization of a temperature indicating material starts at one location, color change is completed abruptly and hence it is difficult to estimate an elapsed time from the degree of the color change. A temperature sensing material that changes a color density continuously (gently) with the lapse of time therefore is desired. If a material changes a color density continuously with the lapse of time, it is possible to estimate an elapsed time from the color density of the material. A temperature sensing material that changes the color density continuously (gently) with the lapse of time can be provided by making many temperature indicating materials exist and observing the average color of the many temperature indicating materials.

In order to satisfy the above conditions, a temperature sensing material is configured so as to disperse many temperature indicating materials in a dispersion medium as shown in FIG. 3.

Any material can be used as a dispersion medium in a temperature sensing material as long as the material can disperse temperature indicating materials. It is necessary, however, to equalize the influence of the interface between the temperature indicating materials and the dispersion medium on the crystallization of all the dispersed temperature indicating materials. An interface touching the temperature indicating materials therefore may desirably include a single material. The interface may also include only a material not influencing the crystallization of temperature indicating materials.

As methods for dispersion that satisfy the above conditions, there are a method of dispersing temperature indicating materials directly in a matrix material and a method of microencapsulating temperature indicating materials and dispersing the microcapsules in a dispersion medium. Otherwise, it is also possible to disperse materials formed by dispersing temperature indicating materials in a matrix material further in another material. It is also possible to consider a microcapsule film as a dispersion medium and use microencapsulated temperature indicating materials directly.

The sizes of temperature indicating materials dispersing in a dispersion medium of a temperature sensing material are important in order to estimate an elapsed time from a color density. Specifically, the diameters of the particles of temperature indicating materials are desirably not larger than a resolution when observed. When the diameters of the particles of temperature indicating materials are not smaller than a resolution when observed, it is difficult to observe the average color of the many existing temperature indicating materials. By observing the average color of many existing temperature indicating materials the particle sizes of which are smaller than a resolution when observed, a temperature sensing material that has a high temporal reproducibility the color change and changes a color density continuously (gently) with the lapse of time can be obtained. When practical applicability is taken into consideration in particular, the average value of the diameters of the particles of temperature indicating materials is desirably not larger than the resolution of a visual observation or a camera. An average particle size of temperature indicating materials therefore is desirably not larger than 20 μm and more desirably not larger than 5 μm.

In a temperature sensing material, since an average time of color change of observed temperature indicating materials comes close to a constant value as the number of the existing temperature indicating materials increases, the temporal reproducibility increases and the performance as a temperature sensing material improves. It is therefore desirable that a larger number of temperature indicating materials exist in a temperature sensing material. It is therefore estimated to be desirable that an average particle size of temperature indicating materials is small and a volume fraction of the temperature indicating materials in a dispersion medium is large. If a volume fraction of temperature indicating materials in a dispersion medium is too large, however, it is difficult to disperse the temperature indicating materials. The volume fraction of temperature indicating materials to a temperature sensing material therefore is desirably not less than 5% to less than 90% and more desirably not less than 10% to not more than 50%.

(Microencapsulation)

There is a method of microencapsulating a temperature indicating material in order to form a temperature sensing material. By microencapsulation, an interface touching a temperature indicating material is limited only to an encapsulant and hence microcapsules can be dispersed in various kinds of dispersion mediums. On this occasion, the type of a dispersion medium is not particularly limited. Further, by microencapsulation, environmental resistance of a temperature indicating material against light, humidity, and the like improves and preservability, discoloration characteristics, and the like can be stabilized. Furthermore, when ink is prepared by dispersing a temperature sensing material in a solvent, it is possible to inhibit a leuco dye, a color developer, and a color eraser from being influenced by other chemical compounds such as a resin agent and an additive.

Known various methods can be applied to microencapsulation. Examples include an emulsion polymerization method, a suspension polymerization method, a coacervation method, an interface polymerization method, a spray drying method, etc. The methods, however, are not limited to those methods. It is also possible to combine two or more different methods.

Examples of a resin film used for a microcapsule include: a urea resin film including a polyvalent amine and a carbonyl compound; a melamine resin film including a melamine formalin prepolymer, a methylol melamine prepolymer, and a methylated melamine prepolymer; a urethane resin film including a polyvalent isocyanate and a polyol compound; an amide resin film including a polybasic acid chloride and a polyvalent amine; and a vinyl resin film including any one of various monomers such as vinyl acetate, styrene, (meth) acrylic acid ester, acrylonitrile, vinyl chloride, etc. The resin films are not limited to those resin films. Further, it is also possible to apply additional treatment such as to apply surface treatment to a formed resin film, thus condition surface energy when making ink or paint, and improve dispersion stability of microcapsules.

(Phase Separation Structuring)

A method of forming a temperature sensing material is not limited to microencapsulation. For example, there is a method of forming a solid material (phase separation structure) by protecting a temperature indicating material with a matrix material that does not have color and a color erasing function. By protecting with a matrix material, preservability, discoloration characteristics, and the like can be stabilized similarly to a microcapsule by not microencapsulation but a simple method. Further, when ink is prepared by dispersing a temperature sensing material in a solvent, it is possible to inhibit a leuco dye, a color developer, and a color eraser from being influenced by other chemical compounds such as a resin agent and an additive.

A matrix material has to be a material not hindering the color developing and erasing performance of a temperature indicating material when the material is mixed with the temperature indicating material. A material which itself does not show the color developing performance therefore is desirable. As such a material, a nonpolar material that is not an electron acceptor can be used.

Further, in order to form a phase separation structure of dispersing a temperature indicating material in a matrix material, a material satisfying the following three conditions has to be used as the matrix material. The three conditions are a solid state is held at an operating temperature of a temperature sensing material; the melting point is higher than the melting point of a temperature indicating material; and the material has a low compatibility with a leuco dye, a color eraser, and a color developer. This is because a temperature and time sensing function is hindered in a state where any material of a leuco dye, a color developer, and a color eraser is compatible with a matrix material. Further, from the viewpoint of handleability, a matrix material in a solid state at an operating temperature is used.

As a matrix material satisfying the above conditions, a material having an energy $\delta p$ caused by dipole interaction among molecules estimated by a Hansen solubility parameter and an energy $\delta h$ caused by hydrogen bond among molecules of 3 or less respectively can preferably be used. Specifically, a material not having a polar group or a material including only hydrocarbon can preferably be used. More specifically, wax including a paraffin system, a microcrystalline system, an olefin system, a polypropylene system, a polyethylene system, and the like; a low-molecular-weight material and a high-molecular-weight material having many frames including propylene, ethylene, styrene, cycloolefin, siloxane, terpene, and the like; a copolymer of those materials; and the like are named.

Among those materials, a material forming a molten liquid of a low viscosity at a melting point or higher and solidifying easily at the melting point or lower has a good handleability. Further, a material dissolving in an organic solvent and solidifying during the volatilization process of the organic solvent also has a good handleability. Specifically, paraffin wax; microcrystalline wax; polyolefin; polyethylene; polypropylene; cycloolefin; polystyrene; terpene resin; silicone resin; silicone oil; and the like are named.

As polyolefin, low-molecular-weight polyethylene, low-molecular-weight polypropylene, and the like are named for example. The molecular weight and the viscosity in a liquid state of polyolefin are not particularly limited but, when the viscosity is low in a liquid state, air bubbles are less included and formability is good. Specifically, a molecular weight of 50,000 or less and a viscosity near a melting point of 10 Pa·S or less are desirable and a molecular weight of 10,000 or less and a viscosity near a melting point of 1 Pa·S or less are more desirable.

Further, such a matrix material can be used also by combining several types.

Furthermore, even a matrix material in a liquid state at an operating temperature can be used in a temperature sensing material if the matrix material forms a phase separation structure together with a temperature indicating material. When a matrix material is a liquid of a high viscosity, the matrix material is excellent in handleability similarly to a matrix material of a solid state. When a matrix material is a high-viscosity liquid, however, a temperature indicating material is not inhibited from precipitating in the matrix material in long-term use and the temperature sensing material separates finally into two phases. The long-term stability as a temperature sensing material therefore is low.

Figure 4A:
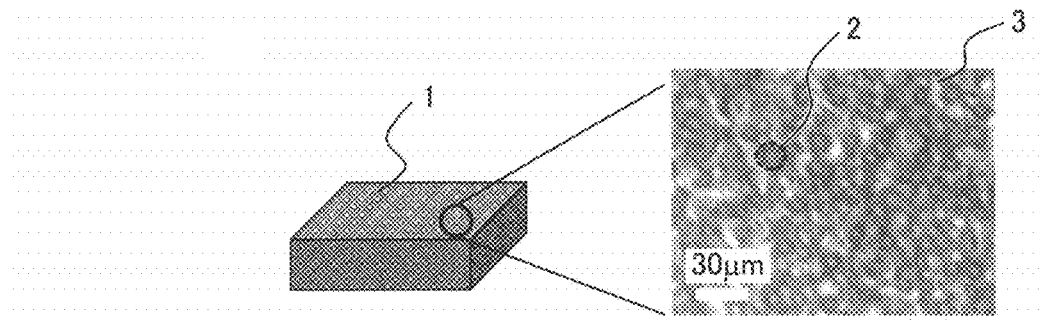
FIGS. 4A and 4B include optical micrographs of phase separation structures according to an embodiment.
Figure 4B:
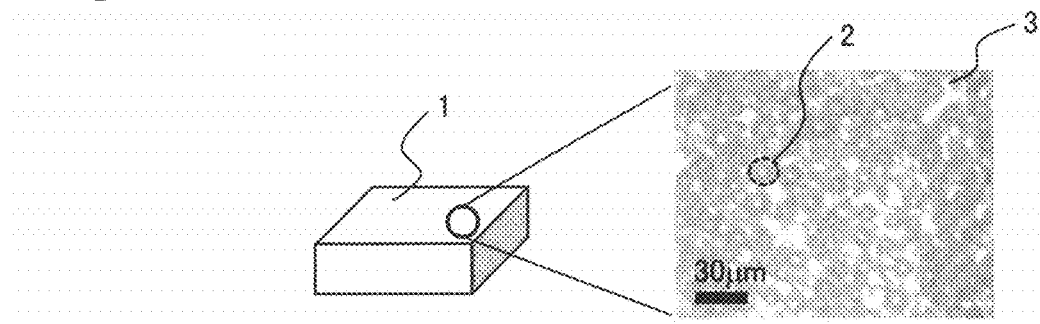

FIG. 4 includes optical micrographs of phase separation structures according to an embodiment. FIG. 4 includes optical micrographs of phase separation structures of temperature sensing materials; (a) is the case of a state of developing color and (b) is the case of a state of erasing color. From the optical micrographs, it is confirmed that a temperature sensing material 1 forms a phase separation structure of dispersing a temperature indicating material 2 in a matrix material 3.

By using a matrix material having a melting point higher than the melting point of a temperature indicating material, even when the temperature indicating material changes color along with a state change from a solid to a liquid or from a liquid to a solid, a temperature sensing material can maintain a solid state. Further, since a matrix material and a temperature indicating material are phase-separated and the matrix material does not influence the color change of the temperature indicating material, the temperature and time sensing function of the temperature indicating material can be maintained as it is.

A phase separation structure can be pulverized by being crushed with a mortar or the like. As a result, the same handling as microcapsules is enabled.

A phase separation structure and microcapsules may be subjected to surface treatment through silane coupling treatment, surface grafting, corona treatment, etc. in order to stabilize dispersion to make ink, improve resistance against a solvent, and improve environmental resistance against light, humidity, and the like. Further, it is also possible to cover a phase separation structure or microcapsules further with a matrix material or other microcapsules.

A phase separation structure can be obtained for example by heating a leuco dye, a color developer, a color eraser, and a matrix material to a temperature not lower than the melting point of the matrix material, mixing them, and then cooling the obtained mixture to a temperature not higher than the solidifying point of the matrix material. During the cooling process, the matrix material and the temperature indicating material phase-separate rapidly and a phase separation structure of dispersing a phase including the leuco dye, the color developer, and the color eraser in the matrix material is formed.

When the mixture is heated to a temperature not lower than the melting point of the matrix material and is in a liquid state, the temperature indicating material and the non-color-developing material may or may not be compatible in accordance with the compatibility between the temper are indicating material and the matrix material. On this occasion, the case where they are compatible is desirable from the viewpoint of handleability. In order that a temperature indicating material and a matrix material are phase-separated at an operating temperature and are compatible in a heated state, it is particularly desirable to adjust the polarity of a color eraser of a large content. If the polarity of the color eraser is too small, the color eraser becomes compatible with the matrix material undesirably at an operating temperature and, if the polarity is too large, the color eraser separates from the matrix material undesirably in a heated state. As a specific calculation method of a polarity, a color eraser having an energy δp caused by dipole interaction among molecules estimated by a Hansen solubility parameter and an energy δh caused by hydrogen bond among molecules of 1 to 10 respectively can preferably be used. Even when the polarity of a color eraser is large and a temperature indicating material and a matrix material are not compatible even in a heated state, however, by cooling the materials while stirring, it is possible to form a phase separation structure. Further, it is also possible to add a surfactant and make the materials compatible.

When the materials are cooled to a temperature not higher than the solidifying point of a matrix material and a phase separation structure is formed, the size of the structure in which a temperature indicating material distributes varies in accordance with the compatibility between the temperature indicating material and the matrix material. With regard to a color eraser and a matrix material of large contents in particular, they disperse finely when the compatibility is good to some extent and disperse largely when the compatibility is poor. From the viewpoint of maintaining a temperature sensing function, the size of a dispersed structure is desirably not smaller than 100 nm to not larger than 20 μm. During the cooling process, by cooling the materials while stirring or adding a surfactant, it is also possible to reduce the size of a dispersed structure.

<Making Ink>

A temperature sensing ink can be manufactured by manufacturing a phase separation structure of dispersing a temperature indicating material in a matrix material or a microencapsulated temperature sensing material beforehand and mixing it with a solvent. A temperature sensing ink can be applied to an ink for a pen, a stamp, a crayon, an inkjet, and the like and a paint for printing.

A temperature sensing ink shows a form of dispersing a temperature sensing material in a solvent. For the purpose, a solvent having a poor compatibility with a matrix material or microcapsules enclosing a temperature indicating material be used.

When a phase separation structure using a matrix material is used as a temperature sensing material, a solvent having a high polarity is preferably used as the solvent. As solvents having high polarities, water and alcohols including glycerin, methanol, ethanol, and propanol can desirably be used. Besides those, ketones including acetone, methyl Ketone, and cyclohexanone, esters including ethyl acetate, methyl acetate, propionate, and methyl propionate, ethers including dimethyl ether and tetrahydrofuran, and the like can be used.

When a microencapsulated temperature sensing material is used, as a solvent, a solvent to which the material of microcapsules is resistant is preferably used. When a material having a high polarity is used as the material of microcapsules, it is preferable to use an organic solvent having a low polarity and specifically non-polar solvents including hexane, benzene, and toluene and oils including petroleum, mineral oil, and silicone oil are particularly desirable, and, besides those, ketones including acetone, methyl ethyl ketone, and cyclohexanone, esters including acetate, methyl acetate, ethyl propionate, and methyl propionate, ethers including dimethyl ether and tetrahydrofuran, and the like are named.

When a material having a low polarity is used as the material of microcapsules, it is preferable to use a solvent having a high polarity and specifically water and alcohols including glycerin, methanol, ethanol, and propanol can desirably be used. Besides those, ketones including acetone, methyl ethyl ketone, and cyclohexanone, esters including ethyl acetate, methyl acetate, ethyl propionate, and methyl propionate, ethers including dimethyl ether and tetrahydrofuran, and the like can be used.

The temperature sensing ink has a temperature and time sensing function even in a liquid state, further the solvent volatilizes by printing, writing, or stamping on a print target or the like, and thus only the temperature sensing material constitutes a printed matter. The printed matter can be used as a temperature and time sensing indicator.

In a temperature sensing ink, an additive may further be added to the solution of an organic solvent or water as long as the temperature and time sensing function is not affected. For example, it is possible to change color during color erasing and during color developing by containing a pigment.

In a temperature sensing ink, various additives and solvents can be used. Further, it is also possible to adjust a viscosity by changing the amounts of a temperature sensing material and an additive. As a result, a temperature sensing ink can be applied as an ink for various printers such as offset printing, gravure printing, flexographic printing, a label printer, a thermal printer, and the like.

<Ink for Inkjet>

A temperature sensing ink can be applied to an ink for a charge control inkjet printer. The ink for a charge control inkjet printer includes a temperature sensing material, a volatile organic solvent, a resin, and a conducting agent.

When the resistance of an ink solution is high, ink particles do not fly straight and tend to bend at the ink discharge port of a charge control inkjet printer. The resistance of an ink solution therefore has to be controlled to about 2,000 Ωcm or less.

A resin, a pigment, and an organic solvent (particularly 2-butane or ethanol used well as an organic solvent of an ink for an inkjet printer) contained in an ink have low conductivities and hence the resistance of the ink solution is as large as about 5,000 to tens of thousands Ωcm. When the resistance is high, a desired printing is hardly obtained by a charge control inkjet printer. In order to reduce the resistance of an ink solution therefore, it is necessary to add a conducting agent to an ink.

As a conducting agent, a complex is preferably used. A conducting agent is required to dissolve in a used solvent, and it is also important not to affect a color tone. Further, a conducting agent of a salt structure is generally used. A conducting agent of a salt structure is estimated to be able to exhibit a high conductivity because electrical charge is polarized in a molecule.

As a result of studying from the above point of view, a conducting agent has a salt structure and a tetraalkyl ammonium ion structure is suitable for a cation. An alkyl chain may be an either linear or branched chain and solubility in a solvent improves as a carbon number increases. Resistance can be reduced, however, with a slight addition rate as the carbon number reduces. A practical carbon number used for an ink is about 2 to 8.

As anions, a hexafluorophosphate ion, a tetrafluoroborate ion, and the like are preferable in that the ions are highly soluble in a solvent.

Meanwhile, a perchlorate ion is also highly soluble, but is explosive, and is not realistic to be used for an ink. Other than that, chlorine, bromine, iodine ions are also named but those ions are not preferable because those ions tend to corrode metals such as iron and stainless steel when those ions touch the metals.

From the above, as preferable conducting agents, tetraethylammonium hexafluorophosphate; tetrapropylammonium hexafluorophosphate; tetrabutylammonium hexafluorophosphate; tetrapentylammonium hexafluorophosphate; tetrahexylammonium hexafluorophosphate; tetraoctylammonium hexafluorophosphate; tetraethylammonium tetrafluoroborate; tetrapropylammonium tetrafluoroborate; tetrabutylammonium tetrafluoroborate; tetrapentylammonium tetrafluoroborate; tetrahexylammonium tetrafluoroborate; tetraoctylammonium tetrafluoroborate; and the like are named.

<Temperature Indicator>

Figure 5:
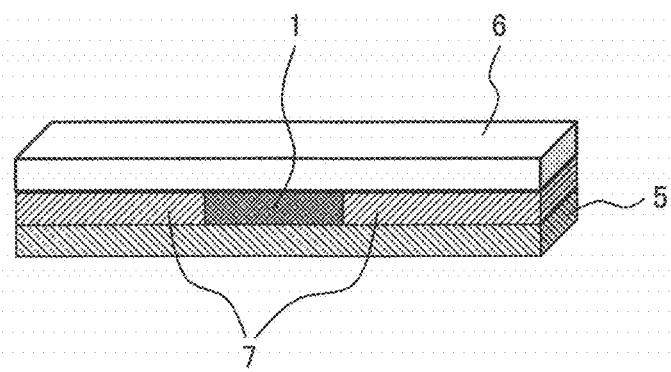
FIG. 5 is a schematic view showing a configuration of a temperature indicator.

FIG. 5 is a schematic view showing a configuration of a temperature indicator. A temperature indicator includes a base material (support) 5, a temperature sensing material 1 arranged over the base material, a transparent base material (protective layer) 6 arranged over the temperature sensing material, and a spacer 7 and is configured so as to interpose the temperature sensing material 1 between the base material 5 and the transparent base material 6.

The base material and the transparent base material are not particularly limited, and any materials are acceptable as long as the transparent base material and the base material interpose the temperature sensing material and the discoloration of the temperature sensing material can be visualized. Further, it is possible not to use the transparent base material. On this occasion, the spacer may not be used.

The material of the base material can be selected freely in accordance with a required function. An organic material such as paper or plastics, an inorganic material such as ceramics or a metal, a composite material of those materials, or the like can be selected freely. It is also possible to form a laminated structure with several types of materials. The material is selected in conformity with a characteristic required of a temperature and time indicator such as high strength, heat resistance, weather resistance, chemical resistance, thermal insulation properties, electrical conductivity, or the like. By adopting the shape of a seal, the temperature indicator can be attached tightly to an object to be sensed. The base material is required to interpose the temperature sensing material and hence is preferably larger than the temperature sensing material.

A continuous porous material may be used as the base material. On this occasion, a structure formed by impregnating a temperature sensing material in a continuous porous material is adopted. By impregnating a temperature sensing material in a continuous porous material, it is possible to change the workability of a temperature indicator in response to the workability of the continuous porous material. A continuous porous material requires such material quality as not to be denatured even when a temperature sensing material touches the continuous porous material for a long duration. To that end, specifically, a material hardly dissolvable in an ordinary organic solvent, such as polyethylene, polypropylene, or cellulose, is suitable. As an inorganic compound, silicon dioxide is also suitable.

As the structure of a continuous porous material, a sponge, a nonwoven fabric, a woven fabric, or the like is named. In the case of cellulose, paper used when a book or a document is made is also acceptable. It is also possible to form a continuous porous body by holding powder of silicon dioxide, polyethylene, or polypropylene with a binder of a similar chemical structure and use the continuous porous body. As the density of voids in a continuous porous body increases, the density for the penetration of a temperature sensing material also increases. A color density therefore can be inhibited from reducing.

The material of the transparent base material can also be selected freely in accordance with a required function. An organic material such as paper or plastics, an inorganic material such as ceramics or a metal, a composite material of those materials, or the like can be selected freely. It is necessary to visualize the discoloration at least at a part of the temperature and time sensing ink and hence transparency is required. For example, organic materials including highly transparent paper, highly transparent plastics such as acryl, polycarbonate, cycloolefin, and the like; highly transparent inorganic compounds including glass, a transparent electrode film, and the like; and the like are named. Besides those highly transparent materials, a material with a transparency enhanced by reducing the thickness is also acceptable. It is also possible to form a laminated structure with several types of materials. The material is selected from those materials in conformity with a characteristic required of a temperature and time indicator such as high strength, heat resistance, weather resistance, chemical resistance, thermal insulation properties, electrical conductivity, resistance to thermal shock due to rapid cooling, or the like.

The size of a transparent base material is only required to be able to visualize a temperature and time sensing body and hence is not limited. From the viewpoint of visibility, the short side when the transparent base material is a rectangle or the short diameter when the transparent base material is an ellipse is preferably 30 µm or larger.

The temperature indicator may have another material between a transparent base material and a temperature sensing material or over the transparent base material in the range of allowing the temperature sensing material to be visualized. For example, it is possible to display printed information printed over printing paper by preparing the printing paper between a transparent base material and a temperature sensing material. Processing such as drilling a hole may also be applied to the transparent base material and the base material. By drilling a hole, the printing paper between the transparent base material and the spacer is exposed. By adopting such a structure, it is possible to write information on the exposed printing paper in the middle of transport or on other occasions.

Further, a temperature indicator may have a heat-insulating layer between a transparent base material and a temperature sensing material. As the heat-insulating layer for example, an air layer, a gas layer such as argon or nitrogen, a vacuum layer, a porous material such as a sponge or an aerogel, a fiber material such as glass wool, rock wool, or cellulose fiber, or a foamed material such as urethane, polystyrene, or expanded rubber can be used. By arranging a heat-insulating layer, it is possible to adjust the time until the temperature sensing material changes color after the temperature outside the temperature sensing material deviates from a management temperature (reaches a sensing temperature of the temperature sensing material). Further, the temperature sensing time can be adjusted by the material types and the thicknesses of the base material and the transparent base material. Furthermore, it is also possible not to install a new heat-insulating layer but to use either the base material or the transparent base material as a heat-insulating layer. As stated above, by forming a heat-insulating layer and adjusting the material types and thicknesses of a base material and a transparent base material, it is possible to control the thermal conductivity from the base material to a temperature sensing material and the thermal conductivity from the transparent base material to the temperature sensing material.

When a seal-shaped base material 5 is attached to an object, an ambient temperature is assumed to be different from the temperature of the object surface. When it is desired to detect the temperature of the object surface, the thermal conductivity from the base material to the temperature sensing material should be increased and the thermal conductivity from the transparent base material to the temperature sensing material should be reduced. For example, the thermal conductivity of the base material should be higher than the thermal conductivity of the transparent base material by forming a heat-insulating layer over the temperature sensing material and adjusting the material types and thicknesses of the transparent base material and the base material. Meanwhile, when it is desired to detect ambient temperature, the thermal conductivity from the base material to the temperature and time sensing body should be reduced and the thermal conductivity from the transparent base material to the temperature and time sensing body should be increased. For example, the thermal conductivity of the transparent base material should be higher than the thermal conductivity of the base material by forming a heat-insulating layer below the temperature sensing material and adjusting the material types and thicknesses of the transparent base material and the base material.

Figure 6A:
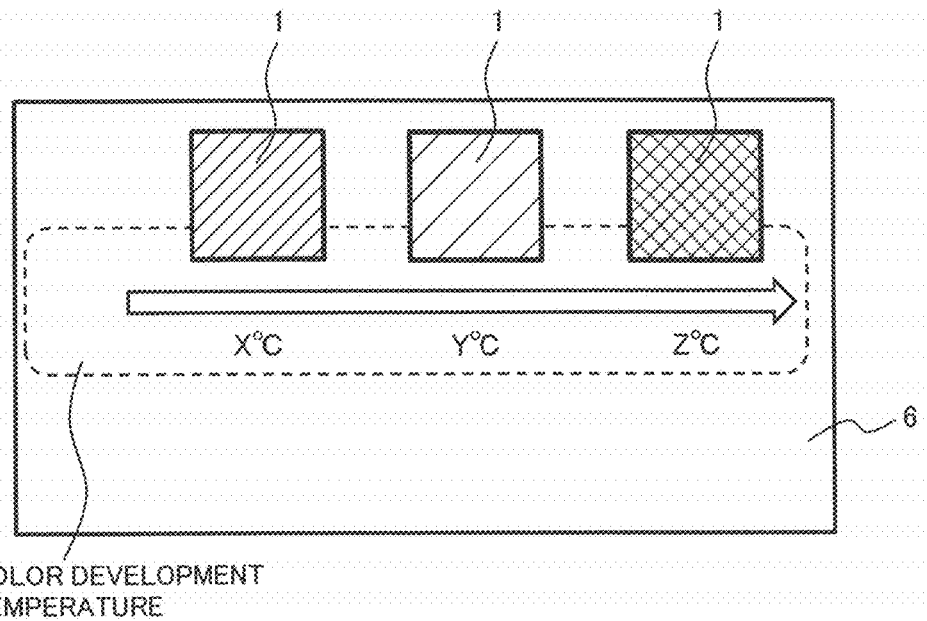
FIGS. 6A to 6C are schematic views showing a configuration of a temperature indicator.
Figure 6B:
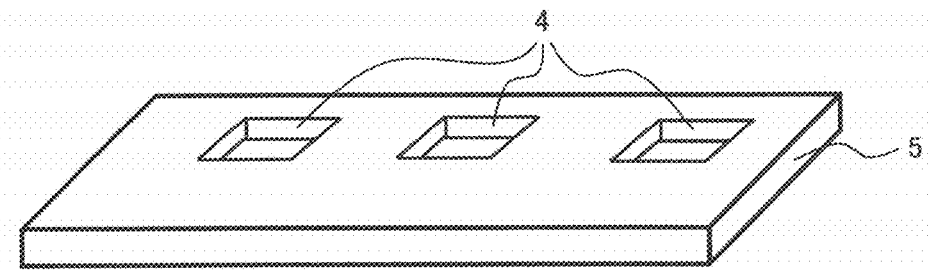
Figure 6C:
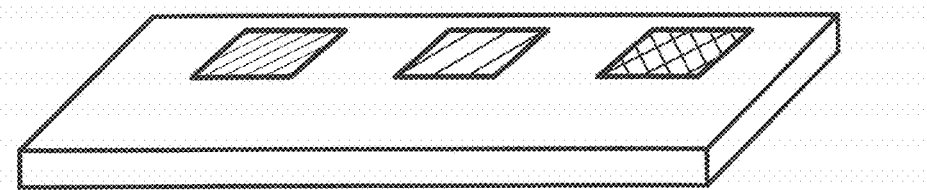

Temperature sensing materials of a plurality of types may be used in a temperature indicator. FIG. 6 is a schematic view showing a configuration of a temperature indicator. A temperature indicator using 3 types of temperature sensing materials is shown in FIG. 6. The temperature indicator has a base material 5 having recesses (dents) 4 and a protective layer 6 formed over the surface of the base material. The protective layer is a sheet film, for example. The recesses 4 retain temperature sensing materials, respectively.

<Initialization Process of Color>

A temperature sensing material can be initialized by being heated to a temperature not lower than the melting point of a temperature indicating material and then being cooled at a rate not lower than a predetermined rate. Here, in the case of a temperature sensing ink, the temperature sensing ink is heated to a temperature not lower than the melting point of a temperature indicating material but lower than the boiling point of a solvent.

A heating method is not particularly limited. When ink in an ink container is heated, a heater, a hotplate, a means of heating the ink container in a heated solvent or the like is named for example. When a material in a temperature indicator is heated, a laminator or the like may be used.

A cooling method after heating is also not particularly limited. Natural cooling or a means for cooling an ink container with a cooler, a freezer, or the like is named for example. A cooling rate not lower than a certain level is required in accordance with a crystallization speed of a temperature indicating material, rapid cooling with a cooler is required for a material of a high crystallization speed, and cooling by natural cooling can preferably be used for a material of a low crystallization speed.

It is also possible to adjust a sensing time of a temperature sensing material by adjusting a cooling rate with a cooler. The color of a temperature sensing material changes by integration of time and temperature in accordance with a crystallization speed. By daring to slow down a cooling rate therefore, it is possible to advance crystallization beforehand and develop color slightly before it is used for temperature management. AS a result, it is possible to advance sensing time more than a material subjected to rapid cooling treatment in an identical temperature and time sensing ink.

<Estimating Method and Estimating System of Temperature Deviation Time>

A method for estimating temperature deviation time using the above temperature sensing material is explained.

In the case of a temperature sensing material using a temperature indicating material A to sense an upper limit temperature, color develops at a temperature not lower than a predetermined temperature (color development start temperature Ta) and the color development rate increases as the temperature rises. From this, it is estimated that the temperature sensing material is exposed only for a short period of time to a predetermined temperature or higher if the temperature sensing material does not develop color.

Meanwhile, in the case of a temperature sensing material using a temperature indicating material B to sense a lower limit temperature, color develops at a temperature not higher than a predetermined temperature (color development start temperature Ta) and the color development rate increases as the temperature drops. From this, it is estimated that the temperature sensing material is exposed only for a short period of time to a predetermined temperature or lower if the temperature sensing material does not develop color.

Figure 7:
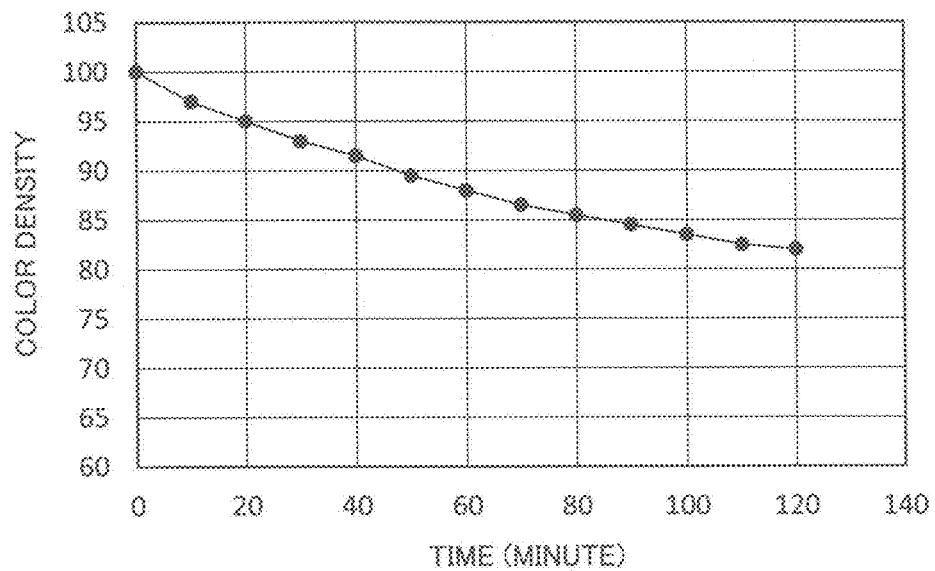
FIG. 7 is a graph showing a relationship between a color density and a time in a temperature sensing material according to an embodiment.

By memorizing a relationship between a time and a color density at each temperature of a temperature sensing material beforehand, if the temperature sensing material develops color, it is possible to backward calculate the relationship between a temperature and a time from the color density when temperature deviates. FIG. 7 shows a relationship between a color density and a time in a temperature sensing material according to an embodiment. As shown in FIG. 7, a temperature sensing material changes color continuously with the lapse of time when the temperature sensing material reaches a crystallization start temperature. When a temperature sensing material is initialized and exposed to the same temperature again, the temperature sensing material repeats the same change as before the initialization. By recording the relationship between a time and a color density at each temperature beforehand therefore, it is possible to estimate a time having elapsed since the temperature is deviated (hereunder referred to a temperature deviation time) from a color density.

A temperature deviation time can be estimated also by combining a plurality of temperature sensing materials. For example, when an upper limit temperature sensing material having a color development start temperature of 10° C. and an upper limit temperature sensing material having a color development start temperature of 20° C. are used together, if only the upper limit temperature sensing material having a color development start temperature of 10° C. changes color, it is identified that the materials are exposed to a temperature not lower than 10° C. to lower than 20° C. and hence the estimation accuracy of a temperature deviation time improves.

Further, the estimation accuracy of a temperature deviation time improves by using temperature that can be obtained from a thermometer, weather information, and the like. For example, when a temperature indicator having an upper limit temperature sensing material having a color development start temperature of 10° C. is attached to a product transported at 0° C. in the outside air of 20° C., if the color of the indicator changes, it can be identified that the product is exposed to 10° C. to 20° C. on this occasion too, the estimation accuracy of a temperature deviation time can improve.

A system for estimating a temperature deviation time using the above temperature sensing material is explained.

Figure 8:
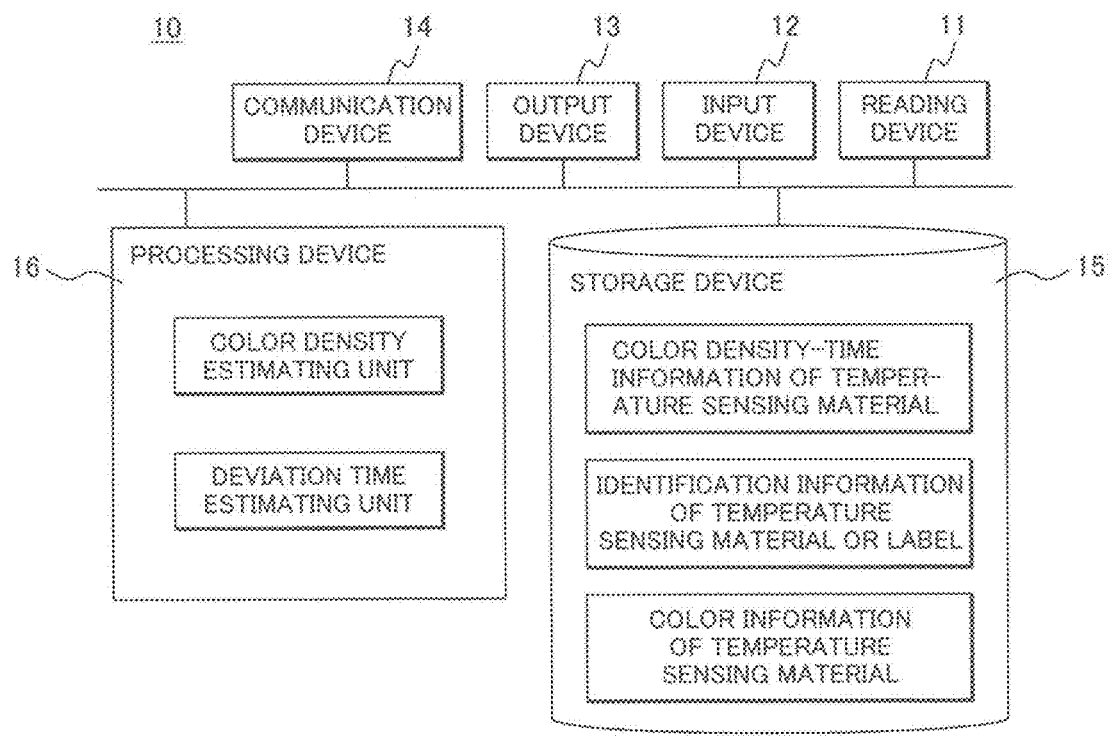
FIG. 8 is a configuration diagram of a deviation time estimating system.

FIG. 8 is a configuration diagram of a deviation time estimating system. As shown in FIG. 8, a temperature deviation time estimating system 10 has a reading device 11 to acquire color information of a temperature sensing material, an input device 12, an output device 13, a communication device 14, a storage device 15, and a processing device 16 to estimate color information acquired by the reading device and a time having elapsed since the temperature sensing material deviated from a temperature.

The reading device 11 acquires the color information of a temperature sensing material. A method of reading the color information of a temperature sensing material is not particularly limited. For example, it is possible to take a photograph of a temperature sensing material with a camera and calculate a color density from the gradation of the taken image. Otherwise, it is also possible to irradiate a temperature sensing material with light such as a laser and calculate color information from the reflected amount or the absorbed amount of the irradiated light. Here, as the numerical information of color tone, besides CIE color space such as L*a*b* or L*C*h*, RGB color space, HSV color space, Munsell color space, etc. are named.

The storage device 15 memorizes a relationship between a color density and a time at each temperature of a temperature sensing material. Besides that, the storage device 15 may store identification information of a temperature sensing material or a temperature indicator and color information of a temperature sensing material read by the reading device.

The processing device 16 estimates a time having elapsed since a temperature sensing material deviated from a temperature on the basis of the color information of the temperature sensing material acquired by the reading device and the relationship between a color density and a time at each temperature of the temperature sensing material stored in the storage device. The processing device may further estimate a temperature deviation time by using temperature information such as an outside air temperature acquired by the communication device and the like. Further, it is also possible to estimate a temperature deviation time by using color information of a plurality of temperature sensing materials having different sensing temperatures (different color development start temperatures). It is possible to improve estimation accuracy by using temperature information and color information of a plurality of temperature sensing materials having different sensing temperatures.

<Product Management System>

A quality control system using a temperature indicator is explained hereunder. A quality control system includes a management device to control the environment where a product is placed and a management terminal to acquired color tone information of a temperature sensing material. The management terminal, when it acquires color tone information, transmits product identification information, the time when the color tone information is acquired, and whether or not a color has changed in an associated manner to the management device.

Figure 9:
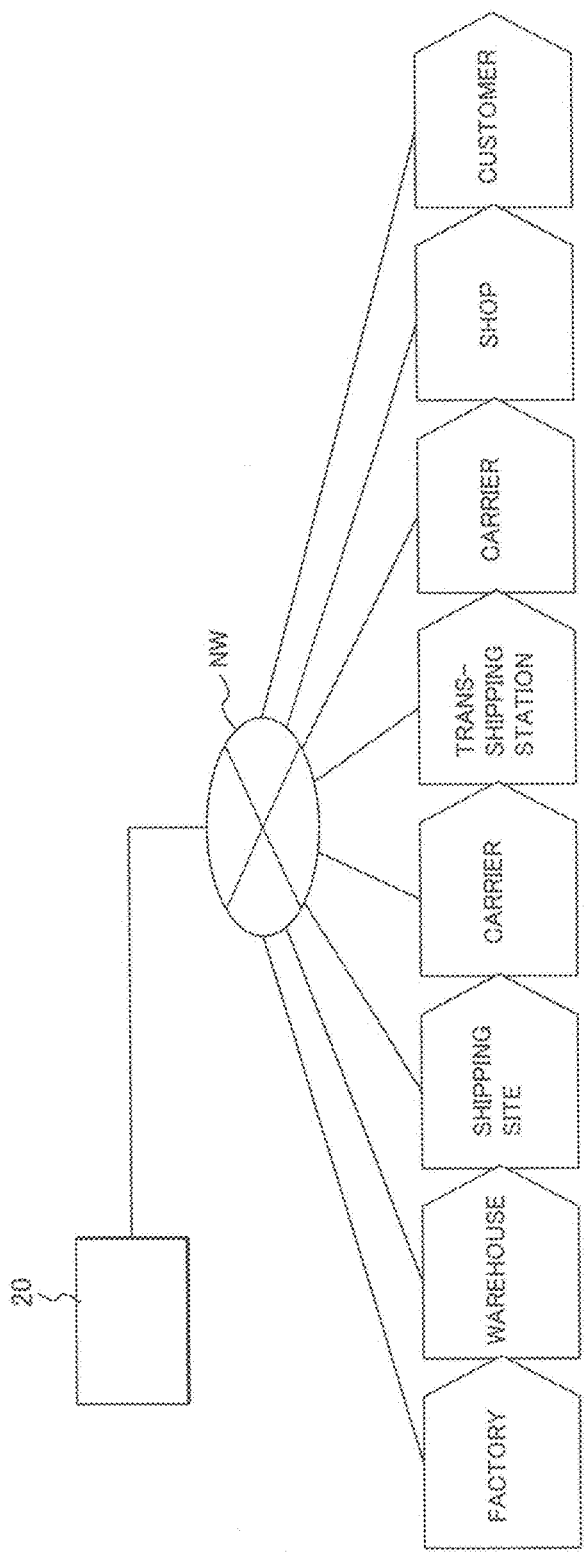
FIG. 9 is a configuration diagram of a quality control system.
Figure 10A:
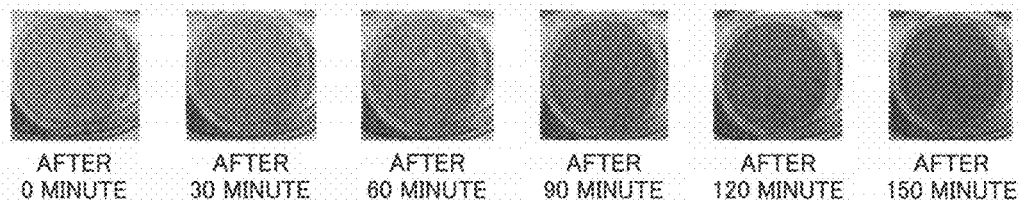
FIGS. 10A to 10D include photographs showing temperature deviation times and color densities in temperature sensing materials according to Examples 1 and 2 and Comparative Examples 1 and 2.
Figure 10B:
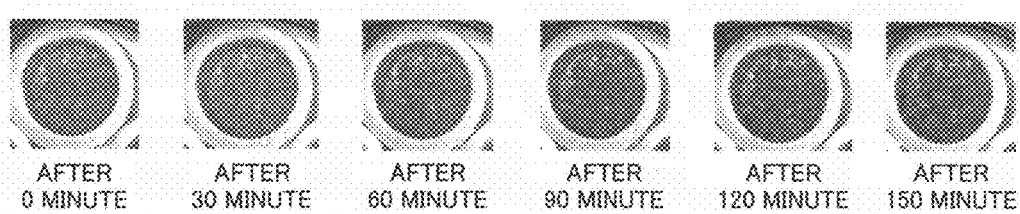
Figure 10C:
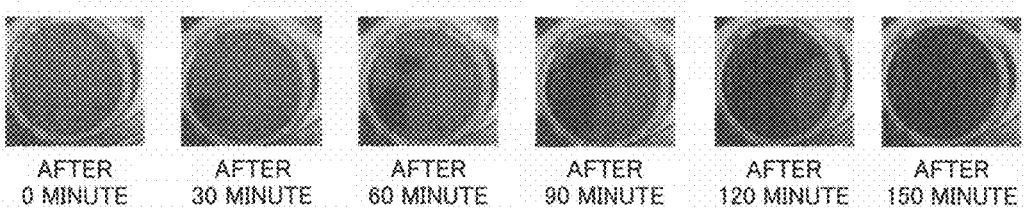
Figure 10D:
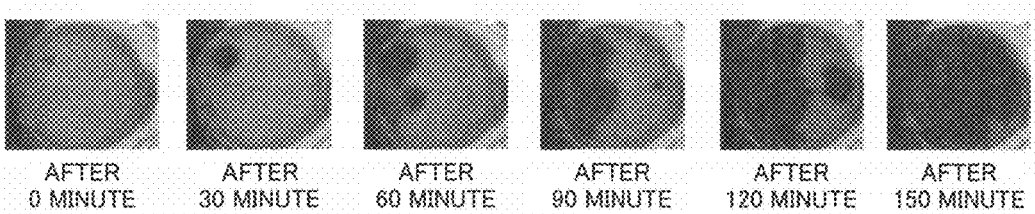

FIG. 9 is a view showing the configuration of a quality control system. Here, explanations are made on the basis of quality control in a distribution route through which a product manufactured at a factory is transferred to a shop, managed at the shop, and successively delivered to a customer.

A quality control system (product management system) includes a management terminal to acquire a code (product identification information) (for example, a barcode) and color tone information of a temperature indicator, those being attached to a product and a management server 20 (management device). The management terminal and the management server 20 are connected communicably through a network NW.

A distribution route includes a factory to manufacture a product, a warehouse to store the product, a shipping site, a carrier, a transshipment station to transfer the product to another carrier, a carrier, and a shop. At each place, a worker collects quality control data by using the management terminal.

The quality control data are collected at the times when a product is manufactured at the factory, is stored in the warehouse, is delivered at the shipping site, is transported by the carrier, receives transshipment work at the transshipment station, is transported by the carrier, is received at the shop, and is stored at the shop for sale and on other occasions.

At each place, a worker can visually check the temperature control status at each process and the temperature load status of the product by checking the color tone of a temperature sensing material. Further, the worker may preferably obtain numerical information as color tone in addition to the visual check.

The worker transmits the quality control information including the optical states and the images of the product and the temperature sensing ink, the reading place, time, etc. to the management server 20 by using the management terminal at each of the processes of shipment, transport, storage, etc.

The management terminal is preferably used for reading the optical state of the temperature sensing material. As a result, each person related to the distribution of the product can acquire the states of the product to be managed at distribution processes as the numerical information of the color tone of a temperature indicating material and hence quantitatively control and share the numerical information.

At the shop, the temperature control status and the temperature load status of the product after the processes of the transport and others from the factory shipment can be checked visually by checking the color tone state of the temperature sensing material of the transported product. Further, it is possible to check information including quality control information until the delivery of the product by being connected to the management server 20 through the management terminal or the like.

The management terminal judges whether or not quality is maintained on the basis of the color tone information of the temperature indicator and displays the judgment result.

That is, a display unit displays that the distribution of a product is inappropriate when color changes and that the distribution of a product is appropriate when color does not change. The judgment result is transmitted from the management server to the management terminal. Quality control data including the judgment result are stored as quality control information in the management server.

In the present embodiment, the quality judgment of whether or not quality is maintained is processed on the side of the management terminal. This is to avoid the concentration of the judgment process and the like and disperse the judgment process in a system for many products. If the processing capacity of the management server 20 is large, the quality judgment may be processed on the side of the management server.

The management server 20 includes a processing unit, a storage unit, an input unit, an output unit, and a communication unit. In the storage unit of the management server, product information, temperature indicator information, distribution condition information, distribution management information, production information, quality control information, etc., those being detailed information of each product to be managed, are stored. The management server gives and receives information to and from the management terminal.

Color density-time information showing the relationship between a color density of a temperature sensing material attached to a product and a time during which the product is placed in an environment may preferably be stored in the storage unit of the management server. By storing the color density-time information in the management server, the management terminal can obtain color density-time information based on obtained product identification information from the management device and calculate the time during which the product is placed in the environment on the basis of the color density of obtained color tone information and the color density-time information. Further, it is possible to display the calculated time on a display unit and transmit the product identification information and the calculated time to the management device in an associated manner. Here, the calculation of the time during which a product is placed in the environment may also be implemented on the side of the management server.

As an example of product information stored in the management server, product information that is information on a product to be managed includes a code (product identification information), a name (product name), a production date, a distribution expiration date, a size, a price, a surface color tone, necessity of temperature control on an temperature indicator, an appropriate temperature, a location of a temperature indicator (marking location), and the like. The temperature indicator information includes a code (product identification information), an appropriate temperature, a judgment temperature, and the like.

To summarize the above, a quality control system (product management system) has a management device (for example, management server 20) to collect color tone information of a temperature sensing material attached to a product and control the environment where the product is placed on the basis of the color tone information and a management terminal to acquire product identification information to identify the product attached to the product and acquire color tone information of a temperature sensing ink. The management terminal transmits the product identification information, a time when the color tone information is acquired, and whether or not color has changed to the management server in an associated manner (for example, temperature indicating data) when the color tone information is acquired. As a result, it is possible to centrally manage temperature indicating data acquired at each place in distribution stages.

A temperature sensing material is hereunder explained more specifically while examples and comparative examples are shown. The present invention, however, is not limited to those examples.

EXAMPLE 1

<Manufacturing Temperature Sensing Material>

3,3-bis(p-dimethylaminophenyl)-6-dimethylamino phthalide (CVL made by YAMADA CHEMICAL CO., LTD.) of 1 part by mass as a leuco dye, octyl gallate made by Tokyo Chemical Industry Co., LTD. of 1 part by mass as a color developer, a material obtained by mixing methyl p-toluate and 2-phenylethyl phenylacetate at a mass ratio of 8:2 of 100 parts by mass as a color eraser, and Hi-WAX NP105 made by Mitsui Chemicals, Inc. of 100 parts by mass as a matrix material were used. Those materials were melted and mixed at 150° C. that was not lower than the melting points of the color eraser and the matrix material and solidified by natural cooling and thus a temperature sensing material having a phase separation structure was manufactured.

<Evaluation of Average Grain Size of Temperature Indicating Material>

In the manufactured temperature sensing material, the average grain size of the temperature indicating material was evaluated. The average grain size of the temperature indicating material in the temperature sensing material having a phase separation structure is evaluated with a scanning electron microscope (S4800 made by Hitachi, Ltd.). The average grain size was evaluated as a median diameter by observing a cross section of the temperature sensing material with the scanning electron microscope and measuring the particle size distribution of particles from the observed image.

<Evaluation of Sensing Function of Temperature and Time>

Initialization of color was implemented by putting the manufactured temperature sensing material into a container and leaving it gently in an environment of not lower than the melting point of the color eraser. After the initialization, the temperature sensing material was left gently in an environment of not higher than a color development start temperature and the state of color change was observed.

Comparative Example 1

3,3-bis(p-dimethylaminophenyl)-6-dimethylamino phthalide (CVL made by YAMADA CHEMICAL CO., LTD.) of 1 part by mass as a leuco dye, octyl gallate made by Tokyo Chemical Industry Co., LTD. of 1 part by mass as a color developer, and a material obtained by mixing methyl p-toluate and 2-phenylethyl phenylacetate at a mass ratio of 8:2 of 100 parts by mass as a color eraser were used. Those materials were melted and mixed at 150° C. that was not lower than the melting point of the color eraser and then solidified by natural cooling and thus a temperature sensing material including only a temperature indicating material was manufactured. Sensing function of temperature and time was evaluated similarly to Example 1.

Comparative Example 2

3,3-bis(p-dimethylaminophenyl)-6-dimethylamino phthalide (CDL made by YAMADA CHEMICAL CO., LTD.) of 1 part by mass as a leuco dye, octyl gallate made by Tokyo Chemical Industry Co., LTD. of 1 part by mass as a color developer, a material obtained by mixing methyl p-toluate and 2-phenylethyl phenylacetate at a mass ratio of 8:2 of 100 parts by mass as a color eraser, and Hi-WAX NP105 made by Mitsui Chemicals, Inc. of 10 parts by mass as a matrix material were used. Those materials were melted and mixed at 150° C. that was not lower than the melting points of the color eraser and the matrix material and solidified by natural cooling and thus a temperature sensing material was manufactured. Sensing function of temperature and time was evaluated similarly to Example 1.

EXAMPLE 2

6'-[ethyl(3-methylbutyl)amino-3'-methyl-2'-(phenylamino)spiro[isobenzofuran-1(3H),9'-(H)xanthene]-3-one (S-205 made by YAMADA CHEMICAL CO., LTD.) of 1 part by mass as a leuco dye, octyl gallate made by Tokyo Chemical industry Co., LTD. of 1 part by mass as a color developer, and a material obtained by mixing methyl p-toluate and 2-phenylethyl phenylacetate at a mass ratio of 8:2 of 100 parts by mass as a color eraser were used. Those materials were microencapsulated by putting an oil phase formed by dissolving 2,2'-azobis(isobutyronitrile) of a polymerization initiator and styrene constituting a resin film in 2-ethylhexyl acrylate into an aqueous phase to which sorbitan fatty acid ester as a surfactant and sodium salt were added and stirring them with a stirrer. Ire this way, a temperature sensing material having a structure of enclosing a temperature indicating material in microcapsules was manufactured.

The average particle size of the temperature indicating material in the microencapsulated temperature sensing material was evaluated with a laser diffraction/scattering particle size analyzer (LA-920 made by HORIBA, Ltd.). A median diameter was evaluated from a measured particle size distribution. Further, sensing function of temperature and time was evaluated similarly to Example 1.

EXAMPLE 3

A temperature indicator using three types of temperature sensing materials was manufactured.

3,3-bis(p-dimethylaminophenyl)-6-dimethylamino phthalide (CVL made by YAMADA CHEMICAL CO., LTD.) of 1 part by mass as a leuco dye, octyl gallate made by Tokyo Chemical Industry Co., LTD. of 1 part by mass as a color developer, Vitamin. K4 made by Tokyo Chemical Industry Co., LTD. of 100 arts by mass as a color eraser, and Hi-WAX NP105 made by Mitsui Chemicals, Inc. of 100 parts by mass as a matrix material were used. Those materials were melted and mixed at 150° C. that was not lower than the melting points of the color eraser and the matrix material, poured into a dent 4 in an acrylic plate, and solidified by natural cooling and thus a first temperature sensing material having a phase separation structure was manufactured.

A second temperature sensing material having a phase separation structure was manufactured similarly to the first temperature sensing material except that the leuco dye is changed to 2'-methyl-6'-(N-p-tolyl-N-ethylamino)spiro [isobenzofuran-1(3H),9'-[9H]xanthene]-3-one (RED520 made by YAMADA CHEMICAL CO., LTD.).

A third temperature sensing material having a phase separation structure was manufactured similarly to the first temperature sensing material except that the leuco dye is changed to 6'-[ethyl(3-methylbutyl)amino-3'-methyl-2'-(phenylamino)spiro[isobenzofuran-1(3H),9'-(H)xanthene]-3-one (S-205 made by YAMADA CHEMICAL CO., LTD.).

A temperature indicator was manufactured by sticking a PET-made transparent sealing film to an acrylic plate from over the temperature sensing materials as shown in FIG. 6.

The average particle sizes of the temperature indicating materials in the first to third temperature sensing materials were evaluated by the same method as Example 1. In the sensing functions of temperature and time of the first to third temperature sensing materials, the state of color change was observed by initializing color by leaving the temperature indicator gently in an environment of not lower than the melting point of the color eraser and successively leaving gently in an environment of not lower than a color development start temperature and lower than the melting point of the color eraser.

EXAMPLE 4

2'-methyl-6'-(N-p-tolyl-N-ethylamino) spiro[isobenzofuran-1 (3H), 9-[9H]xanthen]-3-one (RED520 made by YAMADA CHEMICAL CO., LTD.) of 1 part by mass as a leuco dye, octyl gallate made by Tokyo Chemical Industry Co., LTD. of 1 part by mass as a color developer, and Vitamin K4 made Tokyo Chemical Industry Co., LTD. 100 parts by mass as color eraser were used. Those materials were microencapsulated by putting an oil phase formed by dissolving 2,2'-azobis(isobutyronitrile) polymerization initiator and styrene constituting a resin film in 2-ethylhexyl acrylate into an aqueous phase to which sorbitan fatty acid ester as a surfactant and sodium salt were added and stirring them with a stirrer. In this way, a temperature sensing material formed by microencapsulating a temperature indicating material was manufactured.

A temperature sensing ink was prepared by using a manufactured temperature sensing material. A temperature sensing ink was prepared by putting pure water, a copolymer of polyvinyl alcohol and polyvinyl acetate (number of repeating polyvinyl alcohol units: number of repeating polyvinyl acetate units≈36:64, hydroxyl value is 285), the copolymer having a number average molecular weight (Mn) of 10,000, as a resin, and microcapsules into a container equipped with an impeller and mixing them for about one hour. A temperature indicator was manufactured by pouring the ink into a dent 4 in an acrylic plate and sticking a PET-made transparent sealing film over the acrylic plate into which the ink was poured.

The average particle size of the temperature indicating material in the temperature sensing material was evaluated by a method similar to Example 2. The sensing function of temperature and time of the temperature indicator was evaluated a method similar to Example 3.

Comparative Example 3

6'-[ethyl(3-methylbutyl)amino-3'-methyl-2'-(phenylamino)spiro [isobenzofuran-1(3H),9'-(H)xanthene]-3-one (S-205 made by YAMADA CHEMICAL CO., LTD.) of 1 part by mass as a leuco dye, octyl gallate made by Tokyo Chemical Industry Co., LTD. of 1 part by mass as a color developer, and Vitamin K4 made by Tokyo Chemical Industry Co., LTD. of 100 parts by mass as a color eraser were used. Those materials were melted and mixed at 150° C. that was not lower than the melting point of the color eraser, poured into a dent 4 in an acrylic plate, and cooled naturally. An indicator was manufactured by sticking a PET-made transparent sealing film from over the acrylic plate into which the temperature indicating material was poured as shown ure 6. The sensing function of temperature and time of the indicator was evaluated a method similar to Example 3.

The volume fractions and the average particle sizes of the temperature indicating materials in the temperature sensing materials manufactured in Examples 1 to 4 and Comparative Examples 1 to 3 are shown in Table 1.

TABLE 1

|  | Volume fraction (%) of temperature indicating material to temperature sensing material | Average grain size of temperature indicating material |
|---|---|---|
| Example 1 | 44 | 100 nm |
| Comparative Example 1 | 100 | No particles |
| Comparative Example 2 | 90 | No particles |
| Example 2 | 76 | 2.5 μm |
| Example 3 (first temperature sensing material) | 45 | 150 nm |
| Example 3 (second temperature sensing material) | 45 | 140 nm |
| Example 3 (third temperature sensing material) | 45 | 150 nm |
| Example 4 | 22 | 2.6 μm |
| Comparative Example 3 | 100 | No particles |

Figure 11A:
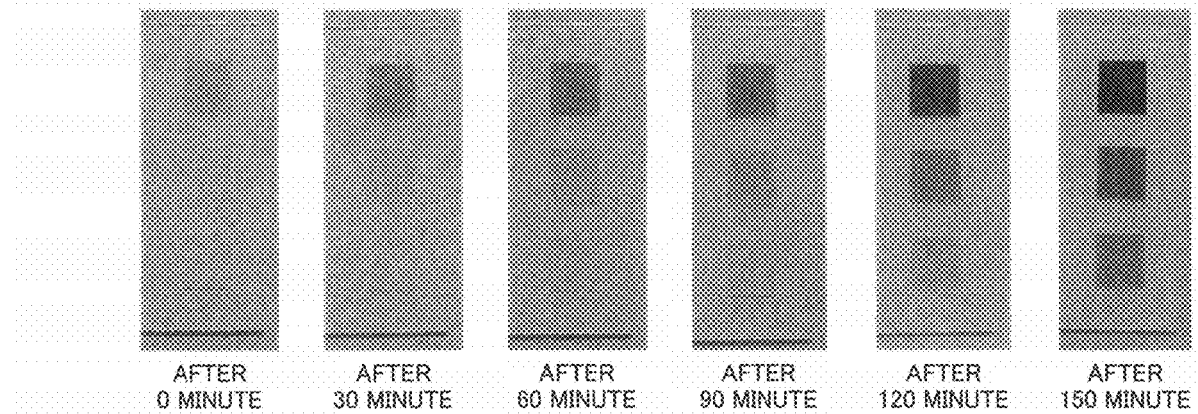
FIGS. 11A to 11C include photographs showing temperature deviation times and color densities in temperature sensing materials according to Examples 3 and 4 and Comparative Example 3.
Figure 11B:
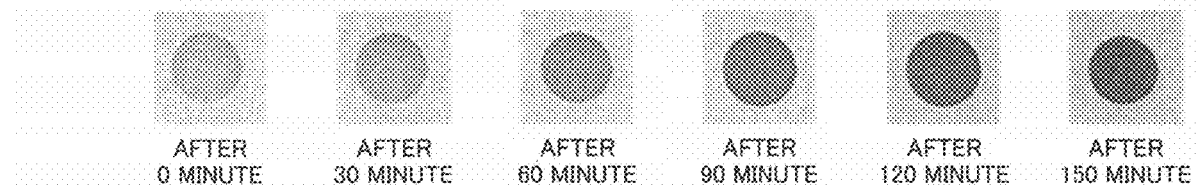
Figure 11C:
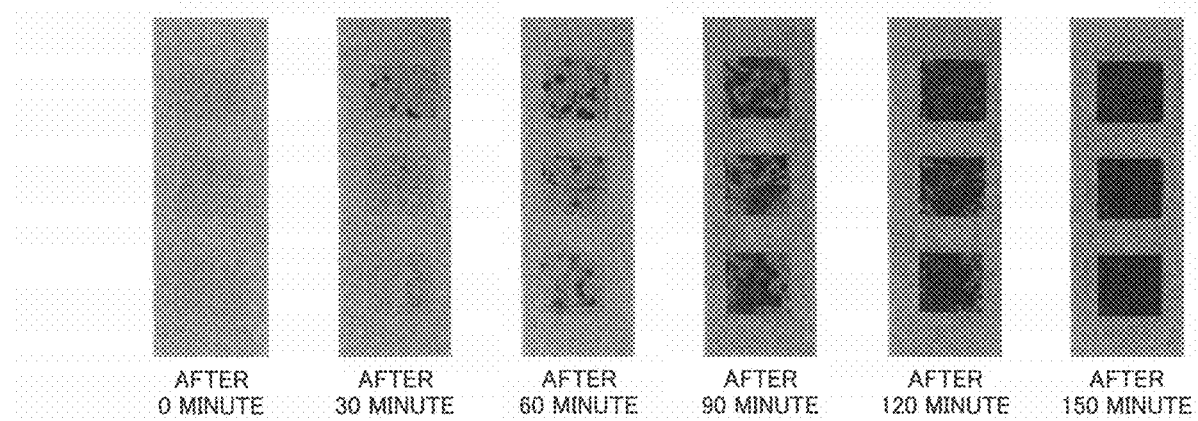

Validation results of the sensing function of temperature and time are explained in reference to FIGS. 10 to 12.

FIG. 10 includes photographs showing temperature deviation times and color densities in the temperature sensing materials according to Examples 1 and 2 and Comparative Examples 1 and 2. Here, the temperature indicating materials used in Examples 1 and 2 and Comparative Examples 1 and 2 are materials to start developing color by crystallization at a predetermined temperature or lower similarly to the temperature indicating material B explained in FIGS. 1 and 2. In the temperature sensing materials according to Examples 1 and 2, it was confirmed that color changes continuously with the lapse of time by being placed in an environment of −10° C.

In contrast, in the temperature sensing materials according to Comparative Examples 1 and 2, it was confirmed that, when color changed at a certain location, the color change advanced around and the color changes abruptly. Further, it was confirmed that, when the color was initialized again at a temperature not lower than the melting point of the color eraser after the color change finishes and then the color was observed again, color change started at different locations and times. From this, with the temperature sensing materials according to Comparative Examples 1 and 2, it is difficult to estimate an elapsed time from the degree of color change. In the case of Comparative Example 1, the reason is thought to be that the temperature sensing material includes only the temperature indicating material and a dispersion structure is not formed. Further, in the case of Comparative Example 2, the reason is thought to be that the temperature sensing material is manufactured by the material similar to Example 1, but the matrix material that is a dispersion medium is smaller than Example 1, and hence a dispersion structure is not formed.

FIG. 11 includes photographs showing temperature deviation times and color densities in the temperature sensing materials according to Examples 3 and 4 and Comparative Example 3. Here, the temperature indicating materials used in Examples 3 and 4 and Comparative Example 3 are materials to start developing color by crystallization at a predetermined temperature or higher similarly to the temperature indicating material A explained in FIGS. 1 and 2.

In the temperature sensing materials according to Examples 3 and 4, it was confirmed that color changed continuously with the lapse of time by being placed in an environment of 10° C.

In contrast, in the temperature sensing material according to Comparative Example 3, it was confirmed that, when color changed at a certain location, the color change advanced around and the color changes abruptly. Further, it was confirmed that, when the color was initialized again at a temperature not lower than the melting point of the color eraser after the color change finished and then the color was observed again, color change started at different locations and times. From this, with the temperature sensing materials according to Comparative Examples 3, it is difficult to estimate an elapsed time from the degree of color change. The reason is thought to be that the temperature sensing material according to Comparative Example 3 includes only the temperature indicating material and a dispersion structure is not formed.

From the above results, it was verified that color changed continuously with the lapse of time at a temperature not lower or higher than a predetermined temperature by using a temperature sensing material having a structure of dispersing a temperature indicating material in a dispersion medium.

Figure 12A:
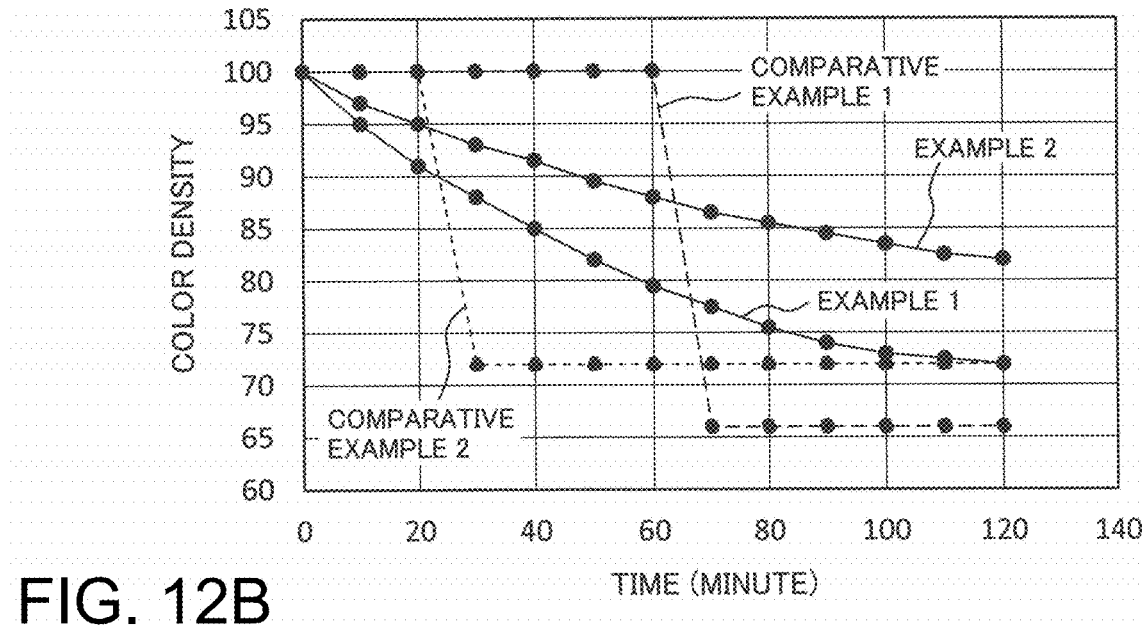
FIGS. 12A and 12B include graphs showing time dependences of color densities in temperature sensing materials according to Examples 1 to 4 and Comparative Examples 1 to 3.

FIG. 12 includes graphs showing the time dependences of color densities in the temperature sensing materials according to Examples 1 to 4 and Comparative Examples 1 to 3. FIG. 12(a) is a graph showing the time dependences of color densities at −10° C. in the temperature sensing materials according to Examples 1 and 2 and Comparative Examples 1 and 2. Here, −10° C. is a temperature not higher than the color development start temperatures of the temperature sensing materials according to Examples 1 and 2 and Comparative Examples 1 and 2.

In Examples 1 and 2 and Comparative Examples 1 and 2, it is confirmed that the color densities change with the lapse of time. In the temperature sensing material having a phase separation structure according to Example 1 and the microencapsulated temperature sensing material according to Example 2, it was confirmed that color changed continuously with the lapse of time. Further, it was confirmed that color change was not seen at all even when the temperature sensing materials according to Examples 1 and 2 were left gently at 0° C. that was a temperature higher than the color development start temperatures. From this, it was verified that the temperature sensing materials according to Examples 1 and 2 could sense a temperature not higher than a predetermined temperature. Furthermore, as a result of heating the temperature sensing materials to a temperature not lower than the melting points of the color erasers after the color change finished, initializing the colors, then leaving the temperature sensing materials gently again at −10° C., and observing the temperature sensing materials, it was confirmed that the changed completely identical to the graph of FIG. 12(a) are shown. From this, the temperature sensing materials according to Examples 1 and 2 can estimate temperature deviation times from the color densities. For example, when the color density of the temperature sensing material according to Example 1 is 95, it can be estimated that the temperature sensing material is exposed to −10° C. for 20 minutes from the graph in FIG. 12(a).

In contrast, in the temperature sensing materials according to Comparative Examples 1 and 2, it was confirmed that the color changed abruptly at certain times. As a result of initializing the color again at a temperature not lower than the melting points of the color erasers after the color change finished, then leaving the temperature sensing materials gently again at −10° C., and observing the temperature sensing materials, it was confirmed that the color densities changed at different times. From those, it is difficult to estimate temperature deviation times from the color densities with the temperature sensing materials according to Comparative Examples 1 and 2.

Figure 12B:
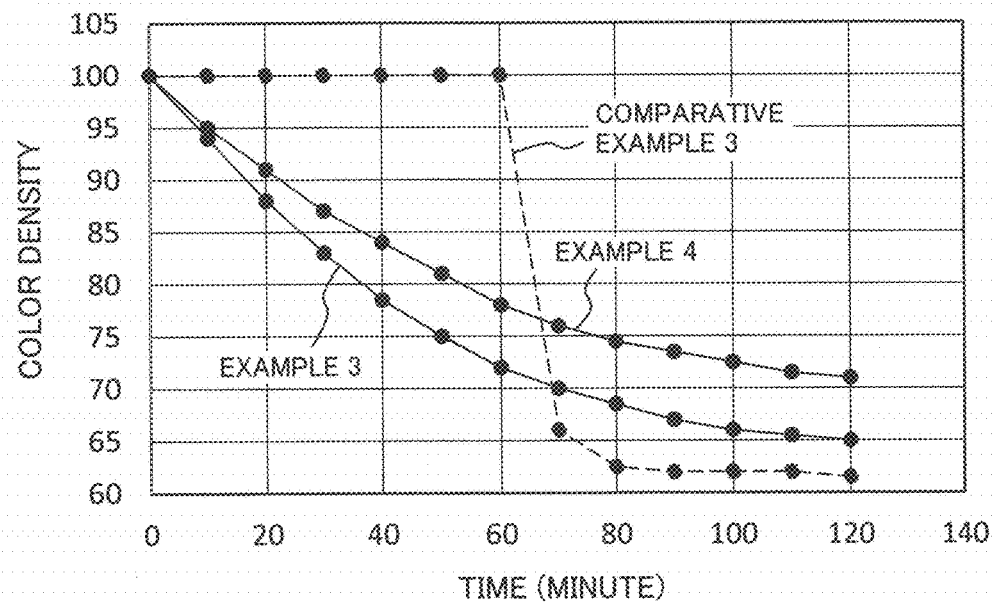

FIG. 12(b) is a graph showing the time dependences of color densities at 10° C. in the temperature sensing materials according to Examples 3 and 4 and Comparative Example 3. Here, 10° C. is a temperature not lower than the color development start temperatures of the temperature sensing materials according to Examples 3 and 4 and Comparative Example 3.

In the temperature sensing material having a phase separation structure according to Example 3 and the microencapsulated temperature sensing material according to Example 4, it was confirmed that color changed continuously with the lapse of time. Further, it was confirmed that color change is not seen at all even when the temperature sensing materials according to Example 3 and 4 were left gently at 0° C. that was a temperature lower than the color development start temperatures. From this, it was verified that the temperature sensing materials according to Example 3 and 4 could sense a temperature not lower than a predetermined temperature. Furthermore, as a result of heating the temperature sensing materials to a temperature not lower than the melting points of the color erasers after the color change finished, initializing the colors, then leaving the temperature sensing materials gently again at 10° C., and observing the temperature sensing materials, it was confirmed that the changes completely identical to the graph of FIG. 12(b) were shown. From this, the temperature sensing materials according to Examples 3 and 4 can estimate temperature deviation times from the color densities. For example, when the color density of the temperature sensing material according to Examples 3 is 75, it can be estimated that the temperature sensing material is exposed to 10° C. for 50 minutes from the graph in FIG. 12(b).

In contrast, in the temperature indicator according to Comparative Example 3, it was confirmed that the color changed abruptly at a certain time. Further, as a result of initializing the color again at a temperature not lower than the melting point of the color eraser after the color change finished, then leaving the temperature indicator gently again at 10° C., and observing the temperature indicator, it was confirmed that the color density changed at a different time. From those, it is difficult to estimate a temperature deviation time from the color density with the temperature sensing material according to Comparative Example 3.

From above, it was confirmed that, by using a temperature sensing material according to the present examples, a temperature sensing material that changed a color density continuously with the lapse of time at a deviation temperature and temperature deviation information and temperature deviation time estimation using the temperature sensing material could be obtained.

Meanwhile the present invention is not limited to the above examples and includes various modified examples. For example, the above examples are explained in detail to make the present invention easier to understand and the present invention is not necessarily limited to the case of having all the explained configurations. Further, a part of the configuration of an example can be replaced with the configuration of another example and the configuration of an example can be added to the configuration of another example. Furthermore, a part of the configuration of each example can be added to, deleted from, and replaced with another configuration.

REFERENCE SIGNS LIST

1 . . . temperature sensing material,
2 . . . temperature indicating material (composition of leuco dye, color developer, and color eraser),
3 . . . dispersion medium,
4 . . . recess (dent),
5 . . . base material (support),
6 . . . transparent base material (protective layer),
7 . . . spacer,
8 . . . printing paper,
9 . . . heat-insulating layer,
10 . . . system for estimating temperature deviation time,
11 . . . reading device,
12 . . . input device,
13 . . . output device,
14 . . . communication device,
15 . . . storage device,
16 . . . processing device,
20 . . . management device.

The invention claimed is:

1. A temperature sensing material having a structure of dispersing a temperature indicating material that starts developing color by crystallization,
   wherein an average particle size of the temperature indicating material is not larger than a resolution when observed; and
   a volume fraction of the temperature indicating material to the temperature sensing material is not less than 5% to less than 90%;
   wherein an average particle size of the temperature indicating material is not larger than 20 µm; and
   wherein the temperature sensing material has a structure of enclosing the temperature indicating material in microcapsules or a phase separation structure of dispersing the temperature indicating material in a matrix material.

2. The temperature sensing material according to claim 1, wherein the matrix material is any one of paraffin wax, microcrystalline wax, polyolefin, polyethylene, polypropylene, cycloolefin, polystyrene, terpene resin, silicone resin, and silicone oil.

3. The temperature sensing material according to claim 1, wherein an average particle size of the temperature indicating material is not larger than 5 µm.

4. The temperature sensing material according to claim 1, wherein a content of the temperature indicating material in the temperature sensing material is not less than 10% by volume to not more than 50% by volume.

5. The temperature sensing material according to claim 1, wherein the temperature sensing material is a material that changes a color density continuously with a lapse of time when the temperature sensing material reaches a crystallization start temperature.

6. The temperature sensing material according to claim 1, wherein the temperature indicating material is a material that starts developing color at a predetermined temperature during temperature rise and erases the color by dissolving from a state of developing the color.

7. The temperature sensing material according to claim 6, wherein the temperature sensing material is a material that changes a color change speed in accordance with a temperature not lower than the predetermined temperature.

8. The temperature sensing material according to claim 1, wherein the temperature indicating material is a material that starts developing color at a predetermined temperature during temperature drop and erases the color by dissolving through heating from a state of developing the color.

9. The temperature sensing material according to claim 8, wherein the temperature sensing material is a material that changes a color change speed in accordance with a temperature not higher than the predetermined temperature.

10. A system for estimating temperature deviation time, wherein the system has:
a reading device to acquire color information of the temperature sensing material according to claim 1 attached to a product;
a storage device to store a relationship between a time and a color density at each temperature of the temperature sensing material; and
a processing device to estimate a time that has elapsed since a temperature became to a temperature not lower or higher than the predetermined temperature from the relationship between a time and a color density at each temperature of the temperature sensing material stored in the storage device and color density information acquired by the reading device.

11. The system for estimating temperature deviation time according to claim 10, wherein the processing device further estimates the elapsed time by using color densities of a plurality of temperature sensing materials.

12. The system for estimating temperature deviation time according to claim 10, wherein the processing device further estimates the elapsed time by using temperature information.

13. The system for estimating temperature deviation time according to claim 11, wherein the reading device is a device to calculate and acquire color information from an image or a device to calculate and acquire color information from a reflected amount or an absorbed amount of light emitted to an object.

14. A temperature sensing material having a structure of dispersing a temperature indicating material that changes color by crystallization,
wherein the temperature indicating material is a material that changes a color change speed in accordance with a temperature;
an average particle size of the temperature indicating material is not larger than a resolution when observed; and
a volume fraction of the temperature indicating material to the temperature sensing material is not less than 5% to less than 90%.

* * * * *